US012698385B2

(12) United States Patent
Sakatani

(10) Patent No.: US 12,698,385 B2
(45) Date of Patent: Aug. 4, 2026

(54) ACTIVE ENERGY RAY-CURABLE COMPOSITION, AQUEOUS EMULSION COMPOSITION, LAMINATE, AND COATING AGENT COMPOSITION

(71) Applicant: Mitsubishi Chemical Corporation, Tokyo (JP)

(72) Inventor: Shuhei Sakatani, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 629 days.

(21) Appl. No.: 18/305,423

(22) Filed: Apr. 24, 2023

(65) Prior Publication Data

US 2023/0279211 A1 Sep. 7, 2023

Related U.S. Application Data

(63) Continuation of application No. PCT/JP2021/040101, filed on Oct. 29, 2021.

(30) Foreign Application Priority Data

Oct. 30, 2020 (JP) ................................ 2020-182985
Sep. 9, 2021 (JP) ................................ 2021-146647

(51) Int. Cl.

| | |
|---|---|
| ***C08F 2/26*** | (2006.01) |
| ***C08F 20/14*** | (2006.01) |
| ***C08J 7/04*** | (2020.01) |
| ***C08J 7/18*** | (2006.01) |
| ***C08L 33/10*** | (2006.01) |
| ***C09D 7/63*** | (2018.01) |
| ***C09D 133/10*** | (2006.01) |

(52) U.S. Cl.

CPC ................ *C08L 33/10* (2013.01); *C08F 2/26* (2013.01); *C08F 20/14* (2013.01); *C08J 7/0427* (2020.01); *C08J 7/18* (2013.01); *C09D 7/63* (2018.01); *C09D 133/10* (2013.01); *C08J 2333/10* (2013.01); *C08L 2201/54* (2013.01); *C08L 2203/16* (2013.01)

(58) Field of Classification Search

None

See application file for complete search history.

(56) References Cited

U.S. PATENT DOCUMENTS

2006/0205869 A1 9/2006 Steidl et al.

FOREIGN PATENT DOCUMENTS

| | | | | |
|---|---|---|---|---|
| CN | 108137761 | A | | 6/2018 |
| JP | 9-137081 | A | | 5/1997 |
| JP | 2003-293288 | A | | 10/2003 |
| JP | 2006-522190 | A | | 9/2006 |
| JP | 2007-191529 | A | | 8/2007 |
| JP | 2008303258 | A | * | 12/2008 |
| JP | 2011-6599 | A | | 1/2011 |
| JP | 2011-12121 | A | | 1/2011 |
| JP | 2012-149141 | A | | 8/2012 |
| JP | 2017-171715 | A | | 9/2017 |
| JP | 2017-226787 | A | | 12/2017 |
| JP | 2020-152786 | A | | 9/2020 |
| JP | 2021-38280 | A | | 3/2021 |
| WO | WO-2006/006402 | A1 | | 1/2006 |

OTHER PUBLICATIONS

Combined Chinese Office Action and Search Report Issued Mar. 27, 2025 in Chinese Patent Application No. 202180072575.2 (with unedited computer-generated English translation), 18 pages.
International Search Report issued Dec. 21, 2021, in PCT/JP2021/040101 filed on Oct. 29, 2021, 2 pages.
Japanese Office Action issued Dec. 3, 2024 in Japanese Patent Application No. 2021-177651 (with English translation), 15 pages.
Extended European Search Report issued Mar. 15, 2024 in European Patent Application No. 21886400.7, 7 pages.
Japanese Notice of Reasons for Refusal issued Oct. 21, 2025 in Japanese Patent Application No. 2022-143896 with English Machine translation, 13 pgs.
Japanese Office Action issued Sep. 24, 2025 in Japanese Patent Application No. 2022-143896 with English Machine translation, 10 pgs.
Japanese Office Action issued Jun. 17, 2025, in corresponding Japanese Patent Application No. 2021-177651 (with English Translation), 12 pages.
European Office Action issued Jun. 8, 2026, in European Application No. 21886400.7, therein, 8 total pages.

* cited by examiner

*Primary Examiner* — Richard A. Huhn
(74) *Attorney, Agent, or Firm* — Oblon, McClelland, Maier & Neustadt, L.L.P.

(57) ABSTRACT

An active energy ray-curable composition that is of a forced emulsification type, has a high non-volatile content, has excellent storage stability at room temperature and high temperature, and has excellent freeze-thaw stability, in which a coating film to be coated on a substrate has excellent adhesiveness and water resistance; an aqueous emulsion composition; a laminate; and a coating agent composition are provided. In an active energy ray-curable composition containing two or more kinds of surfactants, at least one kind of the surfactants is a surfactant (B1) having two or more reactive groups. Further, the active energy ray-curable composition is used in an aqueous emulsion composition or a coating agent composition.

20 Claims, No Drawings

ACTIVE ENERGY RAY-CURABLE COMPOSITION, AQUEOUS EMULSION COMPOSITION, LAMINATE, AND COATING AGENT COMPOSITION

CROSS-REFERENCE TO RELATED APPLICATIONS

The present application is bypass continuation of international application PCT/JP2021/040101, filed on Oct. 29, 2021, and claims the benefit of the filing date of Japanese Appl. No. 2020-182985, filed on Oct. 30, 2020, and Japanese Appl. No. 2021-146647, filed on Sep. 9, 2021, the content of each of which is incorporated by reference.

TECHNICAL FIELD

The present invention relates to an active energy ray-curable composition, an aqueous emulsion composition, a laminate, and a coating agent composition. More specifically, the present invention relates to an aqueous emulsion composition which has excellent storage stability at room temperature and high temperature and has a high non-volatile content, and among these, an aqueous emulsion composition formed by forcibly emulsifying an active energy ray-curable composition; and a coating agent composition.

This application is a continuation application of International Application No. PCT/JP2021/040101, filed on Oct. 29, 2021, which claims the benefit of priority of the prior Japanese Patent Application No. 2020-182985, filed Oct. 30, 2020 and Japanese Patent Application No. 2021-146647, filed Sep. 9, 2021, the content of which is incorporated herein by reference.

BACKGROUND ART

Urethane (meth)acrylates obtained by reacting a diol compound such as polyester diol and polyether diol, a diisocyanate compound such as isophorone diisocyanate and diphenylmethane diisocyanate, and a hydroxyl group-containing (meth)acrylate such as hydroxyethyl acrylate have been known as active energy ray-curable resins, and are used for applications such as wood coatings and plastic coating agents.

Such urethane (meth)acrylates generally have high viscosity. Therefore, when using the urethane (meth)acrylate, the urethane (meth)acrylate is diluted with an organic solvent or a reactive diluent to adjust the viscosity, and then applied. Thereafter, the urethane (meth)acrylate is irradiated with active energy rays such as ultraviolet rays to form a cured coating film.

However, when the urethane (meth)acrylate is diluted with the organic solvent, it becomes a problem under recent VOC regulations against air pollution, work environment, fire risk, and the like. On the other hand, when the urethane (meth)acrylate is diluted with the reactive diluent, a large amount of the reactive diluent may be required to lower the viscosity, and there are problems such as difficulty in obtaining sufficient physical properties of the coating film.

Under such circumstances, in recent years, there has been an increasing demand for a water-based system such as a water-dispersed type.

Patent Document 1 proposes a self-emulsification type active energy ray-curable resin composition obtained by producing a urethane (meth)acrylate containing a carboxy group and an alkylene glycol chain in the absence of a solvent, neutralizing the carboxyl group of the urethane (meth)acrylate, and further adding water to emulsify the urethane (meth)acrylate.

Patent Document 2 proposes a forced emulsification type active energy ray-curable aqueous emulsion composition obtained by dispersing a polyfunctional acrylate compound and a photopolymerization initiator in an aqueous medium in the presence of an emulsifier.

Patent Document 3 proposes a forced emulsification type emulsion coating material composition obtained by dispersing a mono- or polypentaerythritol (meth)acrylate, a urethane poly(meth)acrylate compound, and a photopolymerization initiator in water in the presence of a reactive surfactant.

CITATION LIST

Patent Documents

[Patent Document 1]
Japanese Unexamined Patent Application, First Publication No. 2020-152786
[Patent Document 2]
Japanese Unexamined Patent Application, First Publication No. 2012-149141
[Patent Document 3]
Japanese Unexamined Patent Application, First Publication No. H09-137081

SUMMARY OF INVENTION

Technical Problem

However, in the technology disclosed in Patent Document 1, since the active energy ray-curable aqueous emulsion is of a self-emulsification type, it is difficult to achieve a high non-volatile content while maintaining a low viscosity, so that there is a problem with drying properties during coating film formation. In addition, there is no consideration of the storage stability of liquids at high temperatures and freeze-thaw stability. Furthermore, there is no consideration of the flexibility of the coating film.

In addition, in the technology disclosed in Patent Document 2, the forced emulsification is performed using a non-reactive emulsifier in Examples. An emulsion composition obtained using such a non-reactive emulsifier is insufficient in terms of water resistance because the non-reactive emulsifier exists in a liberated state when the emulsion composition is formed into a cured coating film. Although there are examples of reactive emulsifiers in the specification, there is no consideration of the above-described points at all.

Furthermore, in the technology disclosed in Patent Document 3, the forced emulsification is performed using a reactive emulsifier, but there is no consideration of the storage stability of liquids at high temperatures and freeze-thaw stability. In addition, a water resistance test is limited to a hot water test at 80° C. With the increasing demand for performance in recent years, there is a demand for materials which can withstand more severe water resistance tests.

Against this background, an object of the present invention is to provide an active energy ray-curable composition that is of a forced emulsification type, has a high non-volatile content, has excellent storage stability at room temperature and high temperature, and has excellent freeze-thaw stability, in which a coating film to be coated on a substrate has excellent adhesiveness and water resistance; an aqueous emulsion composition; a laminate; and a coating agent composition.

Solution to Problem

One aspect of the present invention includes the following configurations.

[1] An active energy ray-curable composition, comprising:

two or more kinds of surfactants, wherein at least one kind of the surfactants is a surfactant (B1) having two or more reactive groups.

[2] The active energy ray-curable composition according to [1], wherein a content of the surfactant (B1) is 50 weight % or more with respect to a total mass of the surfactants.

[3] The active energy ray-curable composition according to [1] or [2], wherein the surfactant (B1) has a polyoxyalkylene chain in a structure of the surfactant (B1).

[4] The active energy ray-curable composition according to any one of [1] to [3], wherein the surfactant (B1) is a urethane (meth)acrylate.

[5] The active energy ray-curable composition according to any one of [1] to [4], further comprising:

a surfactant (B2) (excluding the surfactant (B1)), wherein the surfactant (B2) is a surfactant represented by General Formula (1), $$XO—(Y1O)_m—(Y2O)_n—SO_3Z \quad (1)$$

(here, X is a functional group having a double bond, Y1 and Y2 are alkylene groups, in which Y1 and Y2 are groups different from each other, Z is a counterion, m is an integer of 1 or more, and n is an integer of 0 or more).

[6] The active energy ray-curable composition according to any one of [1] to [5], further comprising:

a photopolymerizable compound (A).

[7] The active energy ray-curable composition according to [6], wherein the photopolymerizable compound (A) includes a (meth)acrylate monomer (A1).

[8] The active energy ray-curable composition according to [6], wherein the photopolymerizable compound (A) includes a urethane (meth)acrylate (A2) (excluding the surfactant (B1)).

[9] The active energy ray-curable composition according to any one of [6] to [8], wherein the photopolymerizable compound (A) is contained in an amount of 40 to 99 weight % with respect to 100 weight % of a total of the photopolymerizable compound (A) and the surfactants.

[10] The active energy ray-curable composition according to any one of [1] to [9], further comprising:

a photopolymerization initiator (C).

[11] The active energy ray-curable composition according to any one of [1] to [10], further comprising:

water.

[12] An aqueous emulsion composition, comprising:

the active energy ray-curable composition according to any one of [1] to [10].

[13] A coating agent composition comprising:

the active energy ray-curable composition according to any one of [1] to [11].

[14] A laminate comprising:

at least one layer formed of the active energy ray-curable composition according to any one of [1] to [10].

[15] An aqueous emulsion composition, comprising:

an active energy ray-curable composition, wherein a pencil hardness of a coating film formed under the following conditions, which is measured with a load of 1 kg in accordance with a method of JIS K 5600-5-4, is 2H or more, <Coating Film Forming Conditions> the aqueous emulsion composition is applied onto a surface of an easy-adhesive polyethylene terephthalate film having a thickness of 125 μm with a bar coater, dried at 100° C. for 2 minutes, and cured by irradiating the aqueous emulsion composition with ultraviolet rays using a high-pressure mercury lamp so that an accumulated amount of light is 450 $mJ/cm^2$, to form a coating film having a film thickness of 10 μm.

Advantageous Effects of Invention

According to the present invention, an active energy ray-curable composition that is of a forced emulsification type, has a high non-volatile content, has excellent storage stability at room temperature and high temperature, and has excellent freeze-thaw stability, in which a coating film to be coated on a substrate has excellent adhesiveness and water resistance; an aqueous emulsion composition; a laminate; and a coating agent composition are provided.

DESCRIPTION OF EMBODIMENTS

The present invention will be described in detail below.

In the present invention, "(meth)acryl" means acryl or methacryl. "(meth)acryloyl" means acryloyl or methacryloyl. "(meth)acrylate" means acrylate or methacrylate.

A number-average molecular weight is a number-average molecular weight in terms of standard polystyrene molecular weight, and is measured, for example, by a method based on a hydroxyl value measured in accordance with JIS K 1577 or by high-performance liquid chromatography. In the high-performance liquid chromatography, for example, the number-average molecular weight is measured by using four columns: one column of ACQUITY APC XT 450, one column of ACQUITY APC XT 200, and two columns of ACQUITY APC XT 45 in series in a high-performance liquid chromatograph (manufactured by Waters, "ACQUITY APC system").

A weight-average molecular weight is a weight-average molecular weight in terms of standard polystyrene molecular weight, and in high-performance liquid chromatography, for example, the weight-average molecular weight is measured by using four columns: one column of ACQUITY APC XT 450, one column of ACQUITY APC XT 200, and two columns of ACQUITY APC XT 45 in series in a high-performance liquid chromatograph (manufactured by Waters, "ACQUITY APC system").

In the present specification, "to" indicating a numerical range is used to include numerical values before and after "to" as a lower limit value and an upper limit value.

[Active Energy Ray-Curable Composition]

The active energy ray-curable composition according to the embodiment of the present invention contains two or more kinds of surfactants. At least one kind of the surfactants contained in the active energy ray-curable composition according to the embodiment of the present invention is a surfactant (B1) having two or more reactive groups (hereinafter, also simply referred to as "surfactant (B1)").

The active energy ray-curable composition according to the embodiment of the present invention can be suitably used for a forced emulsification type aqueous emulsion composition.

<Surfactant>

The surfactants include at least the surfactant (B1), and preferably further include a surfactant (B2) other than the surfactant (B1).

[Surfactant (B1)]

In the present invention, since at least one kind of the two or more kinds of surfactants is the surfactant (B1) having two or more reactive groups, a uniform emulsion composition with a small particle size can be obtained. The surfactant (B1) not only assists emulsification, but also greatly contributes to stability of post-emulsification, particularly freeze-thaw stability.

The surfactant (B1) is water-soluble or water-dispersible. The term "water-soluble" means that a uniform appearance can be maintained when preparing an aqueous solution having a concentration of 10 weight %. The term "water-dispersible" means a dispersed state in which a particle size (median diameter) is less than 100 nm when preparing a water dispersion having a concentration of 10 weight %.

The particle size (median diameter) is measured using a laser scattering/diffracting device (manufactured by HORIBA, Ltd.; LA950V2).

As the reactive group in the surfactant (B1), a functional group having a double bond is an example, and a (meth) acryloyl group or an allyl group is preferable. A main chain structure of the surfactant (B1) is not limited as long as it has two or more reactive groups. In addition, the surfactant (B1) preferably has a hydrophilic group in the molecule. The hydrophilic group is preferably a nonionic group, more preferably a polyoxyalkylene chain, and still more preferably a polyoxyethylene chain.

Specifically, for example, polyvinyl alcohol, acrylic (meth)acrylate, urethane (meth)acrylate, polyester (meth) acrylate, and polyether (meth)acrylate, which have two or more functional groups having a double bond, are examples.

Among these, a urethane (meth)acrylate, which is water-soluble or water-dispersible and has two or more functional groups having a double bond, is preferable because a urethane bond is more hydrophilic and a molecular design thereof can be easily controlled.

As the urethane (meth)acrylate satisfying these conditions, for example, a reaction product of a polyisocyanate (b1), a hydroxyl group-containing (meth)acrylate (b2), and a polyoxyethylene group-containing compound (b3) is an example. In addition, a reaction product of a polyisocyanate (b1), a hydroxyl group-containing (meth)acrylate (b2), a polyoxyethylene group-containing compound (b3), and a carboxy group-containing polyol (b4), in which some or all of the carboxy groups are neutralized with a base, is also an example.

As the polyisocyanate (b1), for example, an aromatic polyisocyanate, an aliphatic polyisocyanate, an alicyclic polyisocyanate, a trimer compound of these polyisocyanates, a tri- or higher multimeric compound of these polyisocyanates, an allophanate-type polyisocyanate, a biuret-type polyisocyanate, an adduct-type polyisocyanate, and a water-dispersed type polyisocyanate are examples.

As the aromatic polyisocyanate, for example, tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate are examples. As the aliphatic polyisocyanate, for example, pentamethylene diisocyanate, hexamethylene diisocyanate, trimethylhexamethylene diisocyanate, lysine diisocyanate, and lysine triisocyanate are examples. As the alicyclic polyisocyanate, for example, hydrogenated diphenylmethane diisocyanate, hydrogenated xylylene diisocyanate, isophorone diisocyanate, and norbornene diisocyanate are examples.

These polyisocyanates (b1) may be used alone or in combination of two or more.

Among these, from the viewpoint of less yellowing, aliphatic diisocyanates such as hexamethylene diisocyanate, trimethylhexamethylene diisocyanate, and lysine diisocyanate, alicyclic diisocyanates such as hydrogenated diphenylmethane diisocyanate, hydrogenated xylylene diisocyanate, isophorone diisocyanate, and norbornene diisocyanate, or trimer compounds of these polyisocyanates, allophanate-type polyisocyanates, biuret-type polyisocyanates, or adduct-type polyisocyanates are preferable; a trimer compound of hexamethylene diisocyanate, a biuret-type polyisocyanate of hexamethylene diisocyanate, an adduct-type polyisocyanate of hexamethylene diisocyanate, isophorone diisocyanate, hydrogenated diphenylmethane diisocyanate, or hydrogenated xylylene diisocyanate is more preferable; and from the viewpoint of excellent emulsifying properties, emulsion stability, flexibility of coating film, and low crystallinity, a trimer compound of hexamethylene diisocyanate, isophorone diisocyanate, or hydrogenated xylylene diisocyanate is still more preferable.

The hydroxyl group-containing (meth)acrylate (b2) may have one or more ethylenically unsaturated groups.

As the hydroxyl group-containing (meth)acrylate having one ethylenically unsaturated group, for example, hydroxyalkyl (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, 2-hydroxyethyl acryloyl phosphate, 2-(meth)acryloyloxyethyl-2-hydroxypropyl phthalate, caprolactone-modified 2-hydroxyethyl (meth)acrylate, dipropylene glycol (meth)acrylate, fatty acid-modified glycidyl (meth)acrylate, polyethylene glycol mono(meth)acrylate, polypropylene glycol mono(meth)acrylate, and 2-hydroxy-3-(meth)acryloyloxypropyl (meth)acrylate are examples.

As the hydroxyl group-containing (meth)acrylate having two ethylenically unsaturated groups, for example, glycerin di(meth)acrylate and 2-hydroxy-3-acryloyl-oxypropyl methacrylate are examples.

As the hydroxyl group-containing (meth)acrylate having three or more ethylenically unsaturated groups, for example, pentaerythritol tri(meth)acrylate, caprolactone-modified pentaerythritol tri(meth)acrylate, ethylene oxide-modified pentaerythritol tri(meth)acrylate, dipentaerythritol penta(meth)acrylate, caprolactone-modified dipentaerythritol penta (meth)acrylate, and ethylene oxide-modified dipentaerythritol penta(meth)acrylate are examples.

The hydroxyl group-containing (meth)acrylate (b2) may be used alone or in combination of two or more.

Among these, when flexibility of the coating film is important, a hydroxyl group-containing (meth)acrylate having one ethylenically unsaturated group is preferable; hydroxyalkyl (meth)acrylates having 2 to 4 carbon atoms, such as 2-hydroxyethyl (meth)acrylate, 2-hydroxypropyl (meth)acrylate, and 4-hydroxybutyl (meth)acrylate, polyethylene glycol mono(meth)acrylate, or polypropylene glycol mono(meth)acrylate are more preferable; and 2-hydroxyethyl (meth)acrylate or polyethylene glycol mono(meth) acrylate is still more preferable.

When hardness of the coating film is important, a hydroxyl group-containing (meth)acrylate having three or more ethylenically unsaturated groups is preferable; pentaerythritol tri(meth)acrylate or dipentaerythritol penta(meth)acrylate is more preferable; and dipentaerythritol penta (meth)acrylate is still more preferable.

As the polyoxyethylene group-containing compound (b3), for example, polyethylene glycol is an example.

As the carboxy group-containing polyol (b4), an aliphatic polyhydroxycarboxylic acid is preferable, a diol monocarboxylic acid having a molecular weight of 100 to 200 or a neutralized salt thereof is more preferable; dimethylolbutanoic acid or dimethylolpropionic acid is particularly preferable; and dimethylolbutanoic acid is most preferable. Some or all of the carboxy groups derived from the carboxy group-containing polyol (b4) are neutralized with a base to form a neutralized salt, thereby becoming hydrophilic.

A weight-average molecular weight of the surfactant (B1) is preferably 500 or more, and more preferably 1,000 or more. When the weight-average molecular weight of the surfactant (B1) is the above-described lower limit value or more, the cured coating film is less likely to be brittle. The weight-average molecular weight of the surfactant (B1) is preferably 50,000 or less, and more preferably 20,000 or less. When the weight-average molecular weight of the surfactant (B1) is the above-described upper limit value or less, the viscosity is moderate and easy to handle, and the hardness of the cured coating film is improved. The lower limit and upper limit of the weight-average molecular weight of the surfactant (B1) can be arbitrarily combined, and for example, 500 to 50,000 is preferable and 1,000 to 20,000 is more preferable.

When the surfactant (B1) is a urethane (meth)acrylate, a weight-average molecular weight thereof is preferably 500 or more, more preferably 1,000 or more, and particularly preferably 2,000 or more. When the weight-average molecular weight of the urethane (meth)acrylate is the above-described lower limit value or more, the cured coating film is less likely to be brittle. The weight-average molecular weight of the urethane (meth)acrylate is preferably 50,000 or less and more preferably 20,000 or less. When the weight-average molecular weight of the urethane (meth)acrylate is the above-described upper limit value or less, the viscosity is moderate and easy to handle, and the hardness of the cured coating film is improved. The lower limit and upper limit of the weight-average molecular weight of the surfactant (B1) can be arbitrarily combined, and for example, 500 to 50,000 is preferable and 1,000 to 20,000 is more preferable.

[Surfactant (B2)]

The surfactant (B2) is a surfactant other than the surfactant (B1), and is preferably a surfactant having one reactive group. When the surfactant further includes the surfactant (B2) in addition to the surfactant (B1), it is easier to obtain a uniform emulsion with a small particle size.

The surfactant (B2) is preferably a surfactant having one functional group having a double bond. Such a functional group is preferably a (meth)acryloyl group and an allyl group.

The surfactant (B2) preferably has a linear structure, and more preferably has a linear polyoxyalkylene chain. As the alkylene group in the linear polyoxyalkylene chain, an alkylene group having 2 to 4 carbon atoms is preferable.

It is still more preferable that the surfactant (B2) have the functional group having a double bond at one terminal of the linear polyoxyalkylene chain and a hydrophilic group at the other end.

As the above-described hydrophilic group, an ionic (cationic, anionic, or amphoteric) group is preferable, an anionic group is more preferable, and a sulfonate group is particularly preferable.

As the surfactant (B2), from the viewpoint of obtaining a uniform aqueous emulsion composition with a smaller particle size, a surfactant having one radical-reactive unsaturated bond in the molecule is preferable, and a surfactant represented by General Formula (1) is more preferable.

$$XO—(Y1O)_m—(Y2O)_n—SO_3Z \tag{1}$$

(here, X is a functional group having a double bond, Y1 and Y2 are each independently an alkylene group, in which Y1 and Y2 are groups different from each other, Z is a counterion, m is an integer of 1 or more, and n is an integer of 0 or more).

The functional group in the double bond of X is preferably a (meth)acryloyl group and an allyl group.

Y1 and Y2 are preferably alkylene groups having 2 to 4 carbon atoms.

m is preferably 2 or more, and more preferably 3 or more. The upper limit of m is preferably 30 or less, more preferably 20 or less, and still more preferably 10 or less.

n is preferably 1 or more, and more preferably 2 or more. The upper limit of n is preferably 30 or less, more preferably 20 or less, and still more preferably 10 or less.

Z is preferably $NH_4^+$ or $Na^+$, and particularly preferably $NH_4^+$.

As the surfactant (B2), for example, a (meth)acrylate surfactant, an allyl surfactant, a maleic acid surfactant, and an itaconic acid surfactant are examples. Specifically, a sodium sulfoethyl methacrylate salt, an ammonium sulfoethyl methacrylate salt, an allyl group-containing polyoxyethylene nonylphenyl ether sulfonate salt, a polyoxyethylene lauryl ether maleate, a polyoxyethylene lauryl ether methacrylate, a polyoxyethylene nonylphenyl ether acrylate, and an allyl group-containing polyoxyethylene nonylphenyl ether are examples. These may be used alone or in combination of two or more thereof.

<Photopolymerizable Compound (A)>

It is preferable that the active energy ray-curable composition according to the embodiment of the present invention further contain a photopolymerizable compound (A).

As the photopolymerizable compound (A), for example, a (meth)acrylate monomer (A1), a urethane (meth)acrylate (A2) (excluding the surfactant (B1)), acrylic (meth)acrylate, polyester (meth)acrylate, and polyether (meth)acrylate are examples. From the viewpoint of low viscosity and ease of phase inversion emulsification in the absence of a solvent, the photopolymerizable compound (A) preferably contains a (meth)acrylate monomer (A1).

The photopolymerizable compound (A) may be used alone or in combination of two or more. When a high-viscosity compound such as urethane acrylate is subjected to the phase inversion emulsification in the absence of a solvent, it is preferable to use a low-viscosity compound such as the (meth)acrylate monomer (A1) in combination.

The low-viscosity compound such as the (meth)acrylate monomer (A1) may be added during production of the urethane acrylate and the like, and in this case, the compound acts as a diluent.

As the (meth)acrylate monomer (A1), for example, a monofunctional (meth)acrylate monomer, a bifunctional (meth)acrylate monomer, and a trifunctional or higher (meth)acrylate monomer are examples.

As the monofunctional (meth)acrylate monomer, for example, methyl (meth)acrylate, ethyl (meth)acrylate, 2-methoxyethyl (meth)acrylate, 2-hydroxyethyl (meth)acrylate, 2-hydroxypropyl (meth)acrylate, 2-hydroxybutyl (meth)acrylate, 4-hydroxybutyl (meth)acrylate, phenoxyethyl (meth)acrylate, 2-phenoxy-2-hydroxypropyl (meth) acrylate, 2-hydroxy-3-phenoxypropyl (meth)acrylate, 3-chloro-2-hydroxypropyl (meth)acrylate, glycerin mono (meth)acrylate, glycidyl (meth)acrylate, lauryl (meth)acrylate, cyclohexyl (meth)acrylate, isobornyl (meth)acrylate, tricyclodecanyl (meth)acrylate, dicyclopentenyl (meth)acrylate, dicyclopentenyloxyethyl (meth)acrylate, dicyclopentanyl (meth)acrylate, (2-methyl-2-ethyl-1,3-dioxolan-4-yl)-methyl (meth)acrylate, cyclohexane spiro-2-(1,3-dioxolan-4-yl)-methyl (meth)acrylate, cyclic trimethylolpropane formal acrylate, 3-ethyl-3-oxetanylmethyl (meth)acrylate, γ-butyrolactone (meth)acrylate, n-butyl (meth)acrylate, hexyl (meth)acrylate, heptyl (meth)acrylate, octyl (meth) acrylate, nonyl (meth)acrylate, decyl (meth)acrylate, isodecyl (meth)acrylate, dodecyl (meth)acrylate, n-stearyl (meth)acrylate, benzyl (meth)acrylate, phenoxydiethylene glycol acrylate, phenoxypolyethylene glycol acrylate, nonylphenol propylene oxide-modified (n=2.5) (meth)acrylate, 2-(meth)acryloyloxyethyl acid phosphate, half (meth)acrylate of phthalic acid derivative, such as 2-(meth)acryloyloxy-2-hydroxypropyl phthalate, furfuryl (meth)acrylate, tetrahydrofurfuryl (meth)acrylate, carbitol (meth)acrylate, butoxyethyl (meth)acrylate, (meth)acryloyl morpholine, allyl (meth)acrylate, and polyoxyethylene secondary alkyl ether acrylate are examples.

As the bifunctional (meth)acrylate monomer, for example, ethylene glycol di(meth)acrylate, diethylene glycol di(meth)acrylate, tetraethylene glycol di(meth)acrylate, polyethylene glycol di(meth)acrylate, propylene glycol di(meth)acrylate, dipropylene glycol di(meth)acrylate, polypropylene glycol di(meth)acrylate, butylene glycol di(meth) acrylate, neopentyl glycol di(meth)acrylate, ethylene oxide-modified bisphenol A-type di(meth)acrylate, propylene oxide-modified bisphenol A-type di(meth)acrylate, 1,6-hexanediol di(meth)acrylate, 1,6-hexanediol ethylene oxide-modified di(meth)acrylate, 1,9-nonanediol di(meth)acrylate, phthalic acid diglycidyl ester di(meth)acrylate, hydroxypivalic acid-modified neopentyl glycol di(meth)acrylate, and 2-(meth)acryloyloxyethyl acid phosphate diester are examples.

As the trifunctional or higher (meth)acrylate monomer, for example, trimethylolpropane tri(meth)acrylate, pentaerythritol tetra(meth)acrylate, dipentaerythritol hexa(meth)acrylate, tri(meth)acryloyloxyethoxytrimethylolpropane, isocyanuric acid ethylene oxide-modified triacrylate, ethylene oxide-modified dipentaerythritol hexa(meth)acrylate, ethylene oxide-modified pentaerythritol tetra(meth) acrylate, caprolactone-modified dipentaerythritol hexa(meth)acrylate, and caprolactone-modified pentaerythritol tetra (meth)acrylate are examples.

The (meth)acrylate monomer (A1) may be used alone or in combination of two or more.

As the (meth)acrylate monomer (A1), from the viewpoint that it is easy to obtain a coating film having high hardness, a trifunctional or higher (meth)acrylate monomer is preferable, a tetrafunctional or higher (meth)acrylate monomer is more preferable, and a pentafunctional or higher (meth) acrylate monomer is still more preferable. Dipentaerythritol pentaacrylate or dipentaerythritol hexaacrylate is particularly preferable.

A hydroxyl value of these trifunctional or higher (meth) acrylate monomers is usually 0 to 300 mgKOH/g. The hydroxyl value of the trifunctional or higher (meth)acrylate monomer is preferably 5 mgKOH/g or more, more preferably 10 mgKOH/g or more, still more preferably 20 mgKOH/g or more, particularly preferably mgKOH/g or more, and most preferably 35 mgKOH/g or more. When the hydroxyl value is the above-described lower limit value or more, the hydrophilicity is enhanced, and the storage stability, particularly the freeze-thaw stability is improved. In addition, the hydroxyl value of the trifunctional or higher (meth)acrylate monomer is preferably 150 mgKOH/g or less, more preferably 130 mgKOH/g or less, still more preferably 125 mgKOH/g or less, particularly preferably 100 mgKOH/g or less, and most preferably 60 mgKOH/g or less. When the hydroxyl value is the above-described upper limit value or less, storage stability and hardness at high temperatures are improved. The lower limit and upper limit of the hydroxyl value of the trifunctional or higher (meth) acrylate monomer can be arbitrarily combined, and for example, 5 to 150 mgKOH/g is preferable, 10 to 130 mgKOH/g is more preferable, 20 to 125 mgKOH/g is still more preferable, 30 to 100 mgKOH/g is particularly preferable, and 35 to 60 mgKOH/g is most preferable.

From the viewpoint of easily obtaining a coating film having excellent flexibility, the (meth)acrylate monomer (A1) is preferably a monofunctional (meth)acrylate monomer; and from the viewpoint of excellent emulsifying properties and flexibility, the (meth)acrylate monomer (A1) is more preferably phenoxyethyl (meth)acrylate, phenoxydiethylene glycol acrylate, phenoxypolyethylene glycol acrylate, tetrahydrofurfuryl (meth)acrylate, (meth)acryloyl morpholine, polyoxyethylene secondary alkyl ether acrylate, or isobornyl (meth)acrylate, and particularly preferably phenoxydiethylene glycol acrylate, phenoxypolyethylene glycol acrylate, or isobornyl (meth)acrylate.

From the viewpoint of easily obtaining a coating film having excellent flexibility, it is preferable that the photopolymerizable compound (A) include a urethane (meth) acrylate (A2) (excluding the surfactant (B1)). The urethane (meth)acrylate (A2) is water-insoluble and non-water-dispersible. The term "water-insoluble and non-water-dispersible" means that both the above-described definitions of "water-soluble" and "water-dispersible" are not met.

As the urethane (meth)acrylate (A2), for example, a reaction product of polyisocyanate, polyol, and hydroxyl group-containing (meth)acrylate, and a reaction product of polyisocyanate and hydroxyl group-containing (meth)acrylate are examples. Among these, from the viewpoint of obtaining a flexible coating film, a reaction product of polyisocyanate, polyol, and hydroxyl group-containing (meth)acrylate is preferable.

As the urethane (meth)acrylate (A2), from the viewpoint of coating film toughness, a reaction product of a polyisocyanate (a1), a polyester polyol (a2), and a hydroxyl group-containing (meth)acrylate (a3) is particularly preferable.

[Polyisocyanate (a1)]

As the polyisocyanate (a1), for example, an aromatic polyisocyanate, an aliphatic polyisocyanate, an alicyclic polyisocyanate, a trimer compound of these polyisocyanates, a tri- or higher multimeric compound of these polyisocyanates, an allophanate-type polyisocyanate, a biuret-type polyisocyanate, an adduct-type polyisocyanate, and a water-dispersed type polyisocyanate are examples.

As the aromatic polyisocyanate, for example, tolylene diisocyanate, diphenylmethane diisocyanate, polyphenylmethane polyisocyanate, modified diphenylmethane diisocyanate, xylylene diisocyanate, tetramethylxylylene diisocyanate, phenylene diisocyanate, and naphthalene diisocyanate are examples. As the aliphatic polyisocyanate, for example, pentamethylene diisocyanate, hexamethylene diisocyanate, trimethylhexamethylene diisocyanate, lysine diisocyanate, and lysine triisocyanate are examples. As the alicyclic polyisocyanate, for example, hydrogenated diphenylmethane diisocyanate, hydrogenated xylylene diisocyanate, isophorone diisocyanate, and norbornene diisocyanate are examples.

These polyisocyanates (a1) may be used alone or in combination of two or more.

Among these, from the viewpoint of less yellowing, aliphatic diisocyanates such as hexamethylene diisocyanate, trimethylhexamethylene diisocyanate, and lysine diisocyanate, or alicyclic diisocyanates such as hydrogenated diphenylmethane diisocyanate, hydrogenated xylylene diisocyanate, isophorone diisocyanate, and norbornene diisocyanate are preferable; isophorone diisocyanate, hydrogenated diphenylmethane diisocyanate, or hydrogenated xylylene diisocyanate is more preferable; and from the viewpoint of excellent flexibility and low crystallinity of the coating film, isophorone diisocyanate or hydrogenated xylylene diisocyanate is still more preferable.

[Polyester Polyol (a2)]

As the polyester polyol (a2), at least one selected from the group consisting of a condensation polymer of polyhydric alcohol and polyvalent carboxylic acid, a ring-opening polymer of a cyclic ester compound, and a reactant of three components of polyhydric alcohol, polyvalent carboxylic acid, and a cyclic ester compound is preferable; and from the viewpoint of degree of freedom in formulation, a condensation polymer of polyhydric alcohol and polyvalent carboxylic acid is particularly preferable.

The polyhydric alcohol may be a dihydric alcohol or a trihydric or higher alcohol.

As the dihydric alcohol, an aliphatic diol, an alicyclic diol, and an aromatic diol are examples. As the aliphatic diol, for example, ethylene glycol, diethylene glycol, propylene glycol, dipropylene glycol, trimethylene glycol, 1,4-tetramethylenediol, 1,3-tetramethylenediol, 2-methyl-1,3-trimethylenediol, 1,5-pentamethylenediol, neopentyl glycol, 1,6-hexamethylenediol, 3-methyl-1,5-pentamethylenediol, and 2,4-diethyl-1,5-pentamethylenediol are examples. As the alicyclic diol, for example, 1,2-cyclohexanedimethanol, 1,3-cyclohexanedimethanol, 1,4-cyclohexanedimethanol, spiroglycol, tricyclodecanedimethanol, adamantanediol, and 2,2,4,4-tetramethyl-1,3-cyclobutanediol are examples. As the aromatic diol, for example, bisphenols (bisphenol A, bisphenol B, bisphenol E, and the like), 4,4'-thiodiphenol, 4,4'-methylenediphenol, 4,4'-dihydroxybiphenyl, o-dihydroxybenzene, m-dihydroxybenzene, p-dihydroxybenzene, 2,5-naphthalenediol, p-xylenediol, and ethylene oxide adducts and propylene oxide adducts of these diols are examples.

As the trihydric or higher alcohol, for example, glycerin, trimethylolpropane, trimethylolethane, and sugar alcohols (xylitol, sorbitol, and the like) are examples.

These polyhydric alcohols may be used alone or in combination of two or more.

Among these, a dihydric alcohol is preferable; and from the viewpoint of flexibility of the coating film, an aliphatic diol is preferable, and ethylene glycol, 1,6-hexamethylenediol, 1,5-pentamethylenediol, 1,4-tetramethylenediol, 3-methyl-1,5-pentamethylenediol, or 2-methyl-1,3-trimethylenediol is still more preferable.

As the polyvalent carboxylic acid, for example, an aliphatic dicarboxylic acid, an alicyclic dicarboxylic acid, an aromatic dicarboxylic acid, a trivalent or higher aromatic carboxylic acid, and ester-forming derivatives of these polyvalent carboxylic acids are examples. As the aliphatic dicarboxylic acid, for example, malonic acid, maleic acid, fumaric acid, succinic acid, glutaric acid, adipic acid, suberic acid, azelaic acid, sebacic acid, and dodecanedioic acid are examples. As the alicyclic dicarboxylic acid, for example, 1,3-cyclopentanedicarboxylic acid, 1,2-cyclohexanedicarboxylic acid, 1,3-cyclopentanedicarboxylic acid, and 1,4-cyclohexanedicarboxylic acid are examples. As the aromatic dicarboxylic acid, for example, terephthalic acid, isophthalic acid, orthophthalic acid, 2,6-naphthalenedicarboxylic acid, and p-phenylenedicarboxylic acid are examples. As the trivalent or higher aromatic carboxylic acid, for example, trimellitic acid, pyromellitic acid, and trimesic acid are examples. The ester-forming derivative of the polyvalent carboxylic acid is a compound derived from a polyvalent carboxylic acid capable of forming an ester by reaction with the polyhydric alcohol, and carboxylate, carboxylic acid anhydride, carboxylic acid halide, and carboxylic acid ester are examples. These polyvalent carboxylic acids may be used alone or in combination of two or more.

As the polyvalent carboxylic acid, from the viewpoint of contributing to the adhesiveness with the substrate, an aliphatic dicarboxylic acid, an aromatic dicarboxylic acid, or ester-forming derivatives of these polyvalent carboxylic acids are preferable; adipic acid, isophthalic acid, terephthalic acid, or ester-forming derivatives of these acids are more preferable; from the viewpoint of flexibility of the coating film, adipic acid, isophthalic acid, or ester-forming derivatives of these acids are still more preferable; and isophthalic acid or an ester-forming derivative of isophthalic acid is particularly preferable.

The polyester polyol (a2) preferably contains a constitutional component derived from at least one of isophthalic acid or an ester-forming derivative of isophthalic acid.

As the cyclic ester compound, for example, propiolactone, β-methyl-δ-valerolactone, and ε-caprolactone are examples. These cyclic ester compounds may be used alone or in combination of two or more.

When the polyester polyol (a2) has a large number of hydroxyl groups, gelation tends to occur during the reaction. The number of hydroxyl groups in the polyester polyol (a2) is preferably 2 to 5, more preferably 2 or 3, and from the viewpoint of excellent flexibility of the coating film and excellent adhesiveness to the substrate, particularly preferably 2.

A number-average molecular weight of the polyester polyol (a2) is preferably 300 or more, more preferably 350 or more, and still more preferably 400 or more. When the number-average molecular weight of the polyester polyol (a2) is the above-described lower limit value or more, the flexibility of the coating film and the adhesiveness to the substrate are improved. The number-average molecular weight of the polyester polyol (a2) is preferably 10,000 or less, more preferably 5,000 or less, and still more preferably 2,500 or less. When the number-average molecular weight of the polyester polyol (a2) is the above-described upper limit value or less, the curability is improved. The lower limit and upper limit of the number-average molecular weight of the polyester polyol (a2) can be arbitrarily combined, and for example, 300 to 10,000 is preferable, 350 to 5,000 is more preferable, and 400 to 2,500 is still more preferable.

A method for producing the polyester polyol (a2) is not particularly limited. For example, a mixture of a polyhydric alcohol and a polyvalent carboxylic acid and a catalyst are charged in a reaction vessel, the mixture is heated to, for example, 150° C. to 260° C., and esterification reaction or transesterification reaction proceeds while distilling off water or methanol as a by-product, thereby obtaining the polyester polyol (a2). In addition, instead of the mixture of a polyhydric alcohol and a polyvalent carboxylic acid, the cyclic ester compound may be used, or both the mixture of a polyhydric alcohol and a polyvalent carboxylic acid and the cyclic ester compound may be used. In addition, instead of or in addition to the polyvalent carboxylic acid, the ester-forming derivative of a polyvalent carboxylic acid may be used.

[Hydroxyl Group-Containing (Meth)Acrylate (a3)]

The hydroxyl group-containing (meth)acrylate (a3) may have one or more ethylenically unsaturated groups.

As the hydroxyl group-containing (meth)acrylate having one ethylenically unsaturated group, for example, hydroxyalkyl (meth)acrylates such as 2-hydroxyethyl (meth)acrylate, 2-hydroxypropyl (meth)acrylate, 2-hydroxybutyl (meth)acrylate, 4-hydroxybutyl (meth)acrylate, and 6-hydroxyhexyl (meth)acrylate, 2-hydroxyethyl acryloyl phosphate, 2-(meth)acryloyloxyethyl-2-hydroxypropyl phthalate, caprolactone-modified 2-hydroxyethyl (meth)acrylate, dipropylene glycol (meth)acrylate, fatty acid-modified glycidyl (meth)acrylate, polyethylene glycol mono(meth)acrylate, polypropylene glycol mono(meth)acrylate, and 2-hydroxy-3-(meth)acryloyloxypropyl (meth)acrylate are examples. As the hydroxyl group-containing (meth)acrylate having two ethylenically unsaturated groups, for example, glycerin di(meth)acrylate and 2-hydroxy-3-acryloyl-oxypropyl methacrylate are examples. As the hydroxyl group-containing (meth)acrylate having three or more ethylenically unsaturated groups, for example, pentaerythritol tri(meth)acrylate, caprolactone-modified pentaerythritol tri(meth)acrylate, ethylene oxide-modified pentaerythritol tri(meth)acrylate, dipentaerythritol penta(meth)acrylate, caprolactone-modified dipentaerythritol penta(meth)acrylate, and ethylene oxide-modified dipentaerythritol penta(meth)acrylate are examples.

These hydroxyl group-containing (meth)acrylates (a3) may be used alone or in combination of two or more.

Among these, a hydroxyl group-containing (meth)acrylate having one ethylenically unsaturated group is preferable; from the viewpoint of hydrophilic and lipophilic balance, hydroxyalkyl (meth)acrylates having 2 to 4 carbon atoms, such as 2-hydroxyethyl (meth)acrylate, 2-hydroxypropyl (meth)acrylate, and 4-hydroxybutyl (meth)acrylate, polyethylene glycol mono(meth)acrylate, or polypropylene glycol mono(meth)acrylate are more preferable; and 2-hydroxyethyl (meth)acrylate or polyethylene glycol mono(meth)acrylate is still more preferable.

As the hydroxyl group-containing (meth)acrylate (a3), it is preferable to contain a polyoxyalkylene chain-containing compound. As the alkylene group in the polyoxyalkylene chain, an alkylene group having 2 to 4 carbon atoms is preferable. As the polyoxyalkylene chain-containing compound in the hydroxyl group-containing (meth)acrylate (a3), polyethylene glycol mono(meth)acrylate is particularly preferable.

The urethane (meth)acrylate (A2) may be a reaction product obtained by further reacting other components, in addition to the polyisocyanate (a1), the polyester polyol (a2), and the hydroxyl group-containing (meth)acrylate (a3). For example, for the purpose of adjusting hydrophilicity, polyethylene glycol, carboxy group-containing polyol, or the like may be used as the other components. As the carboxy group-containing polyol, an aliphatic polyhydroxycarboxylic acid is preferable, a diol monocarboxylic acid having a molecular weight of 100 to 200 or a neutralized salt thereof is more preferable; dimethylolbutanoic acid or dimethylolpropionic acid is particularly preferable; and dimethylolbutanoic acid is still more preferable. Some or all of the carboxy groups derived from the carboxy group-containing polyol are neutralized with a base to form a neutralized salt, thereby becoming hydrophilic.

When the carboxy group-containing polyol or the like is used, the urethane (meth)acrylate (A2) has an acid value. The acid value of the urethane (meth)acrylate (A2) is preferably 0 mgKOH/g or more, more preferably 2 mgKOH/g or more, and still more preferably 4 mgKOH/g or more. When the acid value of the urethane (meth)acrylate (A2) is the lower limit value or more of the above-described range, the emulsifying properties and emulsion stability are improved. The acid value of the urethane (meth)acrylate (A2) is preferably 50 mgKOH/g or less, more preferably 20 mgKOH/g or less, and still more preferably 10 mgKOH/g or less. When the acid value of the urethane (meth)acrylate (A2) is the upper limit value or less of the above-described range, the flexibility of the coating film is excellent.

A weight-average molecular weight of the urethane (meth)acrylate (A2) is preferably 1,000 or more, more preferably 1,500 or more, and still more preferably 2,000 or more. When the weight-average molecular weight of the urethane (meth)acrylate (A2) is the lower limit value or more of the above-described range, the flexibility and adhesiveness of the coating film are improved. The weight-average molecular weight of the urethane (meth)acrylate (A2) is preferably 100,000 or less, more preferably 50,000 or less, and still more preferably 20,000 or less. When the weight-average molecular weight of the urethane (meth) acrylate (A2) is the upper limit value or less of the above-described range, the emulsifying properties and emulsion stability are excellent. The lower limit and upper limit of the weight-average molecular weight of the urethane (meth) acrylate (A2) can be arbitrarily combined, and for example, 1,000 to 100,000 is preferable, 1,500 to 50,000 is more preferable, and 2,000 to 20,000 is still more preferable.

A viscosity of the urethane (meth)acrylate (A2) at 60° C. is preferably 500 mPa·s or more, more preferably 1,000 mPa·s or more, and still more preferably 2,000 mPa·s or more. The above-described viscosity of the urethane (meth) acrylate (A2) is preferably 1,000,000 mPa·s or less, more preferably 500,000 mPa·s or less, and still more preferably 100,000 mPa·s or less. When the viscosity of the urethane (meth)acrylate (A2) is within the above-described range, handleability is excellent. The lower limit and upper limit of the viscosity of the urethane (meth)acrylate (A2) can be arbitrarily combined, and for example, 500 to 1,000,000 mPa·s is preferable, 1,000 to 500,000 mPa·s is more preferable, and 2,000 to 100,000 mPa·s is still more preferable.

The viscosity is measured with an E-type viscometer.

A method for producing the urethane (meth)acrylate (A2) is not particularly limited, and for example, the following methods (i) to (iii) are examples. From the viewpoint of reaction stability and reduction of by-products, method (ii) is preferable.

(i) method in which the polyisocyanate (a1), the polyester polyol (a2), and the hydroxyl group-containing (meth) acrylate (a3) are charged all at once or separately in a reaction vessel, and reacted (ii) method in which a reaction product obtained by previously reacting the polyisocyanate (a1) and the polyester polyol (a2) is reacted with the hydroxyl group-containing (meth)acrylate (a3)

(iii) method in which a reaction product obtained by previously reacting the polyisocyanate (a1) and the hydroxyl group-containing (meth)acrylate (a3) is reacted with the polyester polyol (a2)

In the methods (i) to (iii), the urethane (meth)acrylate (A2) is obtained by terminating the reaction when the content of residual isocyanate groups in the reaction system becomes 0.5 weight % or less.

In the methods (i) to (iii), it is preferable to use a catalyst for the purpose of promoting the reaction.

As such a catalyst, for example, an organometallic compound, a metal salt, an amine catalyst, a bismuth catalyst, a zirconium catalyst, and zinc 2-ethylhexanoate/zirconium tetraacetylacetonate are examples. As the organometallic compound, for example, dibutyltin dilaurate, trimethyltin hydroxide, tetra-n-butyltin, and tin octylate are examples. As the metal salt, for example, zinc octenoate, tin octenoate, cobalt naphthenate, stannous chloride, and stannic chloride are examples. As the amine catalyst, for example, triethylamine, benzyldiethylamine, 1,4-diazabicyclo[2,2,2]octane, 1,8-diazabicyclo[5,4,0]undecene, N,N,N',N'-tetramethyl-1,3-butanediamine, and N-ethylmorpholine are examples. As the bismuth catalyst, bismuth nitrate, bismuth bromide, bismuth iodide, bismuth sulfide, and the like; organic bismuth compounds such as dibutylbismuth dilaurate and dioctylbismuth dilaurate; organic acid bismuth salts such as bismuth 2-ethylhexanoate, bismuth naphthenate, bismuth isodecanoate, bismuth neodecanoate, bismuth laurate, bismuth maleate, bismuth stearate, bismuth oleate, bismuth linoleate, bismuth acetate, bismuth bisneodecanoate, bismuth disalicylate, and bismuth digallate are examples. As the zirconium catalyst, for example, inorganic zirconium, organic zirconium, and zirconium itself are examples. Among these, dibutyltin dilaurate or 1,8-diazabicyclo[5,4,0]undecene is suitable. These catalysts may be used alone or in combination of two or more.

In the methods (i) to (iii), an organic solvent which does not have a functional group reacting with an isocyanate group, for example, organic solvents such as esters, for example, ethyl acetate, butyl acetate, and the like, ketones, for example, methyl ethyl ketone, methyl isobutyl ketone, and the like, and aromatics, for example, toluene, xylene, and the like can be used. From the viewpoint of reduction of environmental load, it is preferable to carry out the reaction in the absence of a solvent.

The reaction temperature can be 30° C. to 90° C., preferably 40° C. to 80° C.

The reaction time can be 2 to 10 hours, preferably 3 to 8 hours.

When using the urethane (meth)acrylate (A2), a proportion of the urethane (meth)acrylate (A2) in 100 weight % of the photopolymerizable compound (A) is preferably 5 weight % or more, more preferably 20 weight % or more, still more preferably 50 weight % or more, and particularly preferably 70 weight % or more. In addition, the above-described proportion of the urethane (meth)acrylate (A2) is preferably 100 weight % or less, more preferably 95 weight % or less, and still more preferably 90 weight % or less. When the proportion of the urethane (meth)acrylate (A2) is within the above-described range, balance between emulsion stability and flexibility of the coating film is excellent. The lower limit and upper limit of the above-described proportion of the urethane (meth)acrylate (A2) can be arbitrarily combined, and for example, 5 to 100 weight % is preferable, 20 to 100 weight % is more preferable, 50 to 95 weight % is still more preferable, and 70 to 90 weight % is particularly preferable.

A viscosity of the photopolymerizable compound (A) at 60° C. can be 10 mPa·s or more, preferably 100 mPa·s or more, more preferably 200 mPa·s or more, and still more preferably 500 mPa·s or more. When the viscosity of the photopolymerizable compound (A) is the lower limit value or more of the above-described range, necessity of reducing the viscosity by forced emulsification increases. The viscosity of the photopolymerizable compound (A) at 60° C. can be 500,000 mPa·s or less, preferably 200,000 mPa·s or less, more preferably 100,000 mPa·s or less, and still more preferably 50,000 mPa·s or less. When the viscosity of the photopolymerizable compound (A) is the upper limit value or less of the above-described range, it is easier to apply a shearing force, and the emulsifying properties and emulsion stability are improved. The lower limit and upper limit of the viscosity of the photopolymerizable compound (A) can be arbitrarily combined, and for example, the viscosity thereof can be 10 to 500,000 mPa·s, preferably 100 to 200,000 mPa·s, more preferably 200 to 100,000 mPa·s, and still more preferably 500 to 50,000 mPa·s.

<Photopolymerization Initiator (C)>

From the viewpoint of promoting curing when irradiated with active energy rays, it is preferable that the active energy ray-curable composition according to the embodiment of the present invention further contain a photopolymerization initiator (C). The photopolymerization initiator (C) may be used alone or in combination of two or more thereof.

The photopolymerization initiator (C) is not particularly limited as long as it generates radicals by an action of light, and for example, 2,2-dimethoxy-1,2-diphenylethan-1-one, 4-phenoxydichloroacetophenone, 4-t-butyl-dichloroacetophenone, diethoxyacetophenone, 2-hydroxy-2-methyl-1-phenylpropan-1-one, 1-(4-isopropylenephenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 1-hydroxycyclohexylphenyl ketone, 2-methyl-1-[4-(methylthio)phenyl]-2-morpholinopropan-1-one, benzoin, benzoin methyl ether, benzoin ethyl ether, benzoin isopropyl ether, benzoin isobutyl ether, benzyl dimethylketal, benzophenone, benzoylbenzoic acid, methyl benzoylbenzoate, 4-phenylbenzophenone, hydroxybenzophenone, 4-benzoyl-4'-methyldiphenylsulfide, 3,3'-dimethyl-4-methoxybenzophenone, thioxanthone, 2-chlorothioxanthone, 2-methylthioxanthone, 2,4-dimethylthioxanthone, isopropylthioxanthone, camphorquinone, dibenzosuberone, 2-ethylanthraquinone, 4',4"-diethylisophthalophenone, 3,3',4,4'-tetra(t-butylperoxycarbonyl)benzophenone, α-acyloxime ester, acylphosphine oxide, methyl phenyl glyoxylate, benzyl, 9,10-phenanthrenequinone, 4-(2-hydroxyethoxy)phenyl-(2-hydroxy-2-propyl)ketone, 2,4,6-trimethylbenzoyl-diphenyl-phosphine oxide, and bis(2,4,6-trimethylbenzoyl)-phenylphosphine oxide are examples.

Among these, benzyl dimethylketal, 1-hydroxycyclohexylphenyl ketone, benzoin isopropyl ether, 4-(2-hydroxyethoxy)-phenyl(2-hydroxy-2-propyl) ketone, 2-hydroxy-2-methyl-1-phenylpropan-1-one, 2-methyl-1-[4-(methylthio) phenyl]-2-morpholinopropan-1-one, 2,4,6-trimethylbenzoyl-diphenyl-phosphine oxide, or bis(2,4,6- trimethylbenzoyl)-phenylphosphine oxide is preferable; and 1-hydroxycyclohexyl phenyl ketone (manufactured by IGM Resins, "Omnirad 184"), 2-hydroxy-2-methyl-1-phenylpropan-1-one (manufactured by IGM Resins, "Omnirad 1173"), 2-methyl-1-[4-(methylthio)phenyl]-2-morpholinopropan-1-one (manufactured by IGM Resins, "Omnirad 907"), or 2,4,6-trimethylbenzoyl-diphenyl-phosphine oxide (manufactured by IGM Resins, "Omnirad TPO") is particularly preferable.

As the photopolymerization initiator (C), from the viewpoint of further exhibiting more functions in terms of applications as a composition of the aqueous dispersion, it is preferable to use a water-soluble or water-dispersible photopolymerization initiator. As such a photopolymerization initiator (C), for example, 2-(3-dimethylamino-2-hydroxypropoxy)-3,4-dimethyl-9H-thioxanthon-9-one metochloride (manufactured by Octel Chemicals, "Quantacure QTX"), 1-[4-(2-hydroxyethoxy)-phenyl]-2-hydroxy-2-methyl-1-propan-1-one (manufactured by IGM Resins, "Omnirad 2959"), "ESACURE DP250" manufactured by IGM Resins, and "FOM-03011" manufactured by FUJIFILM Wako Pure Chemical Corporation are examples. These may be used alone or in combination of two or more thereof.

Among these, 1-[4-(2-hydroxyethoxy)-phenyl]-2-hydroxy-2-methyl-1-propan-1-one (manufactured by IGM Resins, "Omnirad 2959") is particularly preferable.

The timing of addition of the photopolymerization initiator (C) is not particularly limited, and the photopolymerization initiator (C) may be forcibly emulsified together with the photopolymerizable compound (A), or may be added to the aqueous emulsion composition after the forced emulsification. However, when a water-insoluble and solid photopolymerization initiator is used, the forced emulsification together with the photopolymerizable compound (A) is preferable from the viewpoint of appearance of the coating film.

A content of the photopolymerizable compound (A) in the active energy ray-curable composition according to the embodiment of the present invention is preferably 40 weight % or more, more preferably 50 weight % or more, still more preferably 60 weight % or more, and particularly preferably 70 weight % or more with respect to 100 weight % of the total of the photopolymerizable compound (A) and the surfactants. When the content of the photopolymerizable compound (A) is the above-described lower limit value or more, physical properties derived from the photopolymerizable compound (A) are sufficiently exhibited, and the hardness and water resistance are improved. The above-described content of the photopolymerizable compound (A) is preferably 99 weight % or less, more preferably 95 weight % or less, still more preferably 90 weight % or less, particularly preferably 80 weight % or less, and most preferably 78 weight % or less or 75 weight % or less. When the content of the photopolymerizable compound (A) is the upper limit value or less of the above-described range, a relative amount of the surfactants necessary for emulsifying the photopolymerizable compound (A) is less likely to be insufficient, and the emulsifying properties and emulsion stability are improved. The lower limit and upper limit of the above-described content of the photopolymerizable compound (A) can be arbitrarily combined, and for example, 40 to 99 weight % is preferable, 50 to 95 weight % is more preferable, 60 to 90 weight % is still more preferable, and 70 to 80 weight % is particularly preferable.

A content of the surfactant (B1) in the active energy ray-curable composition is preferably 50 weight % or more, more preferably 60 weight % or more, still more preferably 70 weight % or more, and particularly preferably 76 weight % or more with respect to the total mass of the surfactants. When the content of the surfactant (B1) is the above-described lower limit value or more, an emulsion having a small particle size and a sharp particle size distribution is obtained, and the storage stability, particularly the freeze-thaw stability is improved. The above-described content of the surfactant (B1) is preferably 99.5 weight % or less, more preferably 99 weight % or less, still more preferably 95 weight % or less, and particularly preferably 90 weight % or less with respect to the total mass of the surfactants. When the content of the surfactant (B1) is the above-described upper limit value or less, physical properties derived from the photopolymerizable compound (A) are readily exhibited, and the flexibility of the coating film, the adhesiveness, and the water resistance are improved. The lower limit and upper limit of the above-described content of the surfactant (B1) with respect to the total mass of the surfactants can be arbitrarily combined, and for example, 50 to 99.5 weight % is preferable, 60 to 99 weight % is more preferable, 70 to 95 weight % is still more preferable, and 76 to 90 weight % is particularly preferable.

A content of the surfactant (B1) in the active energy ray-curable composition according to the embodiment of the present invention is preferably 0.9 weight % or more, more preferably 4.0 weight % or more, still more preferably 8.5 weight % or more, and particularly preferably 18 weight % or more with respect to 100 weight % of the total of the photopolymerizable compound (A) and the surfactants. When the content of the surfactant (B1) is the above-described lower limit value or more, an emulsion having a small particle size and a sharp particle size distribution is obtained, and the storage stability, particularly the freeze-thaw stability is improved. The above-described content of the surfactant (B1) is preferably 59.9 weight % or less, more preferably 49 weight % or less, still more preferably 38.5 weight % or less, and particularly preferably 25 weight % or less with respect to 100 weight % of the total of the photopolymerizable compound (A) and the surfactants. When the content of the surfactant (B1) is the above-described upper limit value or less, physical properties derived from the photopolymerizable compound (A) are readily exhibited, and the flexibility of the coating film, the adhesiveness, and the water resistance are improved. The lower limit and upper limit of the above-described content of the surfactant (B1) with respect to 100 weight % of the total of the photopolymerizable compound (A) and the surfactants can be arbitrarily combined, and for example, 0.9 to 59.9 weight % is preferable, 4.0 to 49 weight % is more preferable, 8.5 to 38.5 weight % is still more preferable, and 18 to 25 weight % is particularly preferable.

A content of the surfactant (B2) in the active energy ray-curable composition according to the embodiment of the present invention is preferably 0.1 weight % or more, more preferably 1.0 weight % or more, still more preferably 1.5 weight % or more, and particularly preferably 2.0 weight % or more with respect to 100 weight % of the total of the photopolymerizable compound (A) and the surfactants. When the content of the surfactant (B2) is the above-described lower limit value or more, an emulsion having a small particle size and a sharp particle size distribution is easily obtained, and the storage stability, particularly the storage stability at high temperatures is improved. The above-described content of the surfactant (B2) is preferably 20 weight % or less, more preferably 10 weight % or less, still more preferably 7.0 weight % or less, and particularly preferably 5.0 weight % or less. When the content of the surfactant (B2) is the above-described upper limit value or less, physical properties derived from the photopolymerizable compound (A) are sufficiently exhibited, and the hardness of the coating film, the adhesiveness, and the water resistance are improved. The lower limit and upper limit of the above-described content of the surfactant (B2) can be arbitrarily combined, and for example, 0.1 to 20 weight % is preferable, 1.0 to 10 weight % is more preferable, 1.5 to 7.0 weight % is still more preferable, and 2.0 to 5.0 weight % is particularly preferable.

An amount of the photopolymerization initiator (C) used is preferably 1 part by weight or more, and more preferably 2 parts by weight or more with respect to 100 parts by weight of the total of the photopolymerizable compound (A) and the surfactants. When the amount of the photopolymerization initiator (C) used is the above-described lower limit value or more, a curing speed of curing by irradiation with active energy rays such as ultraviolet rays is sufficiently fast, and a desired cured coating film can be easily obtained. The above-described amount of the photopolymerization initiator (C) used is preferably 20 parts by weight or less, more preferably 16 parts by weight or less, and particularly preferably 10 parts by weight or less. Even when the amount of the photopolymerization initiator (C) used exceeds the above-described upper limit value, curability is not improved, and when the amount of the photopolymerization initiator (C) used is the above-described upper limit value or less, the cured coating film is less likely to yellow. The lower limit and upper limit of the above-described amount of the photopolymerization initiator (C) used can be arbitrarily combined, and for example, 1 to 20 parts by weight is preferable, 1 to 16 parts by weight is more preferable, and 2 to 10 parts by weight is particularly preferable.

As long as it does not inhibit the effects of the present invention, the active energy ray-curable composition according to the embodiment of the present invention may further contain optional components other than the surfactant, the photopolymerizable compound (A), and the photopolymerization initiator (C).

As the optional components, for example, surface modifiers (leveling agents), UV absorbers, organic fillers, inorganic fillers, dyes and pigments, oils, plasticizers, waxes, desiccants, dispersants, wetting agents, gelling agents, stabilizers, antifoaming agents, thixotropy-imparting agents, antioxidants, tackifiers, flame retardants, antistatic agents, fillers, reinforcing agents, matting agents, cross-linking agents, silica, water-dispersed silica, preservatives, antifungal agents, freeze-thaw stabilizers (ethylene glycol and the like), film-forming agents (butyl cellosolve and the like), and polar solvents for assisting dispersion in water (N-methylpyrrolidone, 3-methoxy-N,N-dimethylpropionamide, and the like) are examples. These may be used alone or in combination of two or more.

These components may be blended together with the surfactant (B1) and emulsified (stirred), or may be added to the active energy ray-curable composition after the emulsification.

[Aqueous Emulsion Composition]

The aqueous emulsion composition according to the embodiment of the present invention contains the above-described active energy ray-curable composition according to the embodiment of the present invention. That is, the aqueous emulsion composition according to the embodiment of the present invention is an emulsion composition in which the active energy ray-curable composition according to the embodiment of the present invention is emulsified in a water-based solvent.

The aqueous emulsion composition according to the embodiment of the present invention preferably contains water as an aqueous solvent. The aqueous solvent is not limited to water, and may be a solvent obtained by mixing water with a lower alcohol having 1 to 5 carbon atoms, or the like, as long as the emulsified state is not impaired.

An amount of the aqueous solvent used is preferably 5 weight % or more, more preferably 10 weight % or more, and still more preferably 20 weight % or more with respect to 100 weight % of the total mass of the aqueous emulsion composition. When the amount of the aqueous solvent used is the above-described lower limit value or more, phase inversion tends to occur, and the viscosity tends to be sufficiently low. The above-described amount of the aqueous solvent used is preferably 80 weight % or less, more preferably 70 weight % or less, and still more preferably 60 weight % or less. When the amount of the aqueous solvent used is the above-described upper limit value or less, drying load during coating is reduced. The lower limit and upper limit of the above-described amount of the aqueous solvent used can be arbitrarily combined, and for example, 5 to 80 weight % is preferable, 10 to 70 weight % is more preferable, and 20 to 60 weight % is still more preferable.

A concentration of non-volatile contents in the aqueous emulsion composition according to the embodiment of the present invention is preferably 5 weight % or more, more preferably 10 weight % or more, and still more preferably 20 weight % or more with respect to 100 weight % of the total mass of the aqueous emulsion composition. When the concentration of the non-volatile contents is the above-described lower limit value or more, cissing is less likely to occur on the substrate during coating, and the drying load is reduced. The above-described concentration of the non-volatile contents is preferably 80 weight % or less, more preferably 70 weight % or less, and still more preferably 60 weight % or less. When the concentration of the non-volatile contents is the above-described upper limit value or less, the fluidity is improved, and the coating is facilitated. The lower limit and upper limit of the above-described concentration of the non-volatile contents can be arbitrarily combined, and from the viewpoint of coating workability, for example, 5 to 80 weight % is preferable, 10 to 70 weight % is more preferable, and 20 to 60 weight % is still more preferable.

An average core particle size of the aqueous emulsion composition according to the embodiment of the present invention is preferably 10 nm or more, more preferably 50 nm or more, still more preferably 60 nm or more, and particularly preferably 70 nm or more. When the average core particle size is the above-described lower limit value or more, the viscosity of the emulsion is sufficiently small, and the handleability is excellent. The above-described average core particle size is preferably 1,000 nm or less, more preferably 500 nm or less, still more preferably 200 nm or less, and particularly preferably 150 nm or less. When the average core particle size is the above-described upper limit value or less, aggregation is less likely to occur, and the emulsion stability is improved. The lower limit and upper limit of the above-described average core particle size can be arbitrarily combined, and for example, 10 to 1,000 nm is preferable, 50 to 500 nm is more preferable, 60 to 200 nm is still more preferable, and 70 to 150 nm is particularly preferable.

The average core particle size refers to a volume-based average value of a scattering intensity distribution. The core particle size is measured using a laser scattering/diffracting device (manufactured by HORIBA, Ltd.; LA950V2).

A viscosity of the aqueous emulsion composition according to the embodiment of the present invention at 25° C. is preferably 5 mPa·s or more, more preferably 10 mPa·s or more, and still more preferably 20 mPa·s or more. When the viscosity is the above-described lower limit value or more, the film thickness can be easily controlled. The above-described viscosity is preferably 20,000 mPa·s or less, more preferably 10,000 mPa·s or less, and still more preferably 5,000 mPa·s or less. When the viscosity is the above-described upper limit value or less, it is easier to handle, and the workability of coating is improved. The lower limit and upper limit of the above-described viscosity can be arbitrarily combined, and for example, 5 to 20,000 mPa·s is preferable, 10 to 10,000 mPa·s is more preferable, and 20 to 5,000 mPa·s is still more preferable.

The above-described viscosity is measured with an E-type viscometer (100 rpm).

The aqueous emulsion composition according to the embodiment of the present invention may contain a water dispersion or an aqueous solution, such as an acrylic emulsion and a polyurethane dispersion, which is different from the aqueous emulsion composition according to the embodiment of the present invention.

<Method for Producing Emulsion>

Next, a method for producing the aqueous emulsion composition according to the embodiment of the present invention will be described.

The aqueous emulsion composition according to the embodiment of the present invention is obtained, for example, by forcibly emulsifying the photopolymerizable compound (A) in the aqueous solvent by a phase inversion emulsification method, using two or more kinds of the surfactants in which at least one kind thereof is the surfactant (B1). The term "forcibly emulsifying" means a method of emulsifying and dispersing a compound, which is water-insoluble and does not have emulsifying power by itself, in an aqueous solvent using a surfactant and a shearing force.

A method in which an organic solvent such as methyl ethyl ketone and acetone is added to reduce the viscosity during the phase inversion emulsification and the solvent is removed by reducing pressure after the emulsification is completed is also generally well known, and the system of the present invention can also employ such a method. However, from the viewpoint of VOC reduction, a method of performing the phase inversion emulsification in the absence of a solvent is preferable.

As a specific method thereof, for example, the photopolymerizable compound (A) and two or more kinds of the surfactants including the surfactant (B1) are charged in a beaker container, and while adding ion-exchanged water thereto little by little, the mixture is stirred at 40° C. to 70° C. using a stirrer such as a high-speed disperser, a double cylindrical homogenizer, an ultrasonic homogenizer, a blender, and a mixer. When the amount of ion-exchanged water added exceeds a certain amount, phase inversion from water-in-oil (W/O) to oil-in-water (O/W) occurs, and a uniform emulsion composition with small particle size can be obtained by applying a strong stirring force at the time of phase inversion. Thereafter, the stirring is continued until the temperature returns to room temperature, and as necessary, a surface modifier, an antifoaming agent, an antiseptic agent, a photopolymerization initiator, or the like is added and mixed to obtain the desired aqueous emulsion composition.

With the aqueous emulsion composition according to the embodiment of the present invention, for example, even when an emulsion composition having a concentration of 50 weight % is prepared and allowed to stand at room temperature (23° C.) for 1 to 2 months, no sedimentation is observed and a uniformly dispersed state can be maintained.

A pencil hardness of a coating film formed from the aqueous emulsion composition under the following conditions, which is measured with a load of 1 kg in accordance with a method of JIS K 5600-5-4, is 2H or more, more preferably 3H or more. When the pencil hardness of the above-described coating film is the lower limit value or more, the coating film is highly useful for various applications such as protective coating agents and coating agents for hard coating.

<Coating Film Forming Conditions>

The aqueous emulsion composition is applied onto a surface of an easy-adhesive polyethylene terephthalate film having a thickness of 125 μm with a bar coater, dried at 100° C. for 2 minutes, and cured by irradiating the aqueous emulsion composition with ultraviolet rays using a high-pressure mercury lamp so that an accumulated amount of light is 450 $mJ/cm^2$, to form a coating film having a film thickness of 10 μm.

The term "easy-adhesive polyethylene terephthalate film" means a polyethylene terephthalate film in which one or both surfaces of the film have been surface-modified with a primer such as a water-based urethane resin, a water-based polyester resin, and a water-based acrylic resin. As a product thereof, Cosmoshine A4300 and Cosmoshine A4360 manufactured by TOYOBO CO., LTD. are exemplary examples.

As described above, the active energy ray-curable composition according to the embodiment of the present invention contains two or more kinds of surfactants in which at least one kind thereof is the surfactant (B1). By forcibly emulsifying the active energy ray-curable composition with two or more kinds of surfactants including the surfactant (B1), a uniform aqueous emulsion composition with small particle size can be obtained. Therefore, the obtained aqueous emulsion composition has excellent storage stability at room temperature and high temperature. In addition, the freeze-thaw stability is also excellent, and the change in particle size is small even after repeated freeze-thaw cycles. In addition, the coating film formed by applying the aqueous emulsion composition according to the embodiment of the present invention has excellent adhesiveness to the substrate and excellent water resistance.

In particular, when an anionic surfactant is used as the surfactant (B2), an effect of electrostatic repulsion between particles is obtained, and when a nonionic urethane acrylate is used as the surfactant (B1), an effect of steric repulsion between particles is obtained. When these surfactants are used in combination, the repulsion between particles is strengthened due to the synergistic effect of both, and a uniform aqueous emulsion composition with a very small particle size can be obtained as compared with a case where each surfactant is used alone.

In addition, when the photopolymerizable compound (A) containing the urethane (meth)acrylate (A2) is used, it is easy to form a coating film having excellent flexibility. The aqueous emulsion composition capable of forming a coating film having excellent flexibility is useful for applications such as paints and anchor coating agents. On the other hand, an aqueous emulsion composition capable of forming a coating film having high hardness is useful for applications such as protective coating agents and coating agents for hard coating. In addition, by mixing the aqueous emulsion composition capable of forming a coating film having excellent flexibility and the aqueous emulsion composition capable of forming a coating film having high hardness, it is also possible to achieve both flexibility and hardness.

Applications of the aqueous emulsion composition according to the embodiment of the present invention are not particularly limited, and for example, the aqueous emulsion composition according to the embodiment of the present invention is very useful as various film-forming materials such as paints, protective coating agents, anchor coating agents, coating agents for hard coating, inks, magnetic powder coating binders, sandblasting films, pressure-sensitive adhesives, adhesives, tackifiers, and plate materials.

<Coating Agent Composition>

The aqueous emulsion composition according to the embodiment of the present invention can be used, for example, as a coating agent composition (curable resin composition) for forming a coating film on various substrates, and can be used as a top coating agent, an anchor coating agent, or the like. For example, the aqueous emulsion composition according to the embodiment of the present invention is applied onto a substrate, dried, and irradiated with active energy rays to cure a coating film, whereby it is possible to form a cured coating film on the substrate.

As the coating method, for example, wet coating methods such as spraying, showering, dipping, rolling, spinning, and screen printing are examples.

The drying temperature can be 40° C. to 120° C., preferably 50° C. to 100° C.

The drying time can be 1 to 20 minutes, preferably 2 to 10 minutes.

As the active energy rays, for example, light rays such as far ultraviolet rays, ultraviolet rays, near ultraviolet rays, and infrared rays, electromagnetic waves such as X rays and γ rays, electron beams, proton rays, and neutron rays are examples. Among these, ultraviolet irradiation is preferable in terms of curing speed, availability of irradiation equipment, price, and the like. When electron beam irradiation is performed, the coating agent composition according to the embodiment of the present invention can be cured without using the photopolymerization initiator (C).

As a method of curing the coating film by ultraviolet irradiation, for example, a method using a high-pressure mercury lamp, an ultra-high-pressure mercury lamp, a carbon arc lamp, a metal halide lamp, a xenon lamp, a chemical lamp, an LED lamp, or the like, which emits light in a wavelength range of 150 to 450 nm, is an example. The amount of ultraviolet irradiation may be approximately 100 to 3,000 $mJ/cm^2$. After the ultraviolet irradiation, heating may be performed as necessary in order to ensure the curing.

As the substrate for forming the cured coating film, for example, molded products (films, sheets, cups, and the like) made of resins such as polyolefins (polyethylene, polypropylene, polycyclopentadiene, and the like), polycarbonates, polyesters, ABS resins, and acrylic resins; metals; and glass are examples.

For example, a laminate having at least one layer formed of the active energy ray-curable composition according to the embodiment of the present invention can be obtained. The laminate may have a layer other than the layer formed of the active energy ray-curable composition according to the embodiment of the present invention.

The present invention will be specifically described below with reference to Examples, but the present invention is not limited by the following description. In the examples, "parts" and "%" are based on weight.

<Product Name and Structure of Photopolymerizable Compound (A)>

(A1-0): phenoxydiethylene glycol acrylate (trade name: Lightacrylate P2H-A; manufactured by Kyoeisha Chemical Co., Ltd.)

(A1-1): acrylic acid adduct of dipentaerythritol, having a hydroxyl value of 51 mgKOH/g (trade name: KAYARAD DPHA; manufactured by Nippon Kayaku Co., Ltd.)

(A1-2): acrylic acid adduct of dipentaerythritol, having a hydroxyl value of 33 mgKOH/g (trade name: ARONIX M-402; manufactured by TOAGOSEI CO., LTD.)

(A1-3): acrylic acid adduct of dipentaerythritol, having a hydroxyl value of 30 mgKOH/g or less (trade name: ARONIX M-406; manufactured by TOAGOSEI CO., LTD.)

(A1-4): acrylic acid adduct of dipentaerythritol, having a hydroxyl value of 99 mgKOH/g (trade name: KAYARAD FM-700; manufactured by Nippon Kayaku Co., Ltd.)

(A1-5): acrylic acid adduct of dipentaerythritol, having a hydroxyl value of 62 mgKOH/g (trade name: KAYARAD DPHA; manufactured by Nippon Kayaku Co., Ltd.)

(A1-6): acrylic acid adduct of pentaerythritol, having a hydroxyl value of 120 (trade name: Viscoat #300; manufactured by OSAKA ORGANIC CHEMICAL INDUSTRY LTD.)

(A1-7): pentaerythritol tetraacrylate (trade name: ARONIX M-450; manufactured by TOAGOSEI CO., LTD.)

(A1-8): trimethylolpropane triacrylate (trade name: ARONIX M-309; manufactured by TOAGOSEI CO., LTD.)

(A1-9): isocyanuric acid ethylene oxide-modified di- and triacrylate (trade name: ARONIX M-315; manufactured by TOAGOSEI CO., LTD.)

(A1-10): isocyanuric acid ethylene oxide-modified di- and triacrylate (trade name: ARONIX M-313; manufactured by TOAGOSEI CO., LTD.)

(A1-11): glycerin triacrylate (trade name: ARONIX M-930; manufactured by TOAGOSEI CO., LTD.)

(A1-12): glycerin di- and triacrylate (trade name: ARONIX M-920; manufactured by TOAGOSEI CO., LTD.)

(A1-13): 1,6-hexanediol diacrylate (trade name: Lightacrylate 1.6HX-A; manufactured by Kyoeisha Chemical Co., Ltd.)

(A1-14): acryloyl morpholine (trade name: ACMO; manufactured by KJ Chemicals Corporation)

(A1-15): isobornyl acrylate (trade name: IBXA; manufactured by OSAKA ORGANIC CHEMICAL INDUSTRY LTD.)

(A2-1): urethane acrylate oligomer having 10 functional groups and a weight-average molecular weight of 2,000 (trade name: SHIKOH UV-1700B; manufactured by Mitsubishi Chemical Corporation.)

(A2-2): urethane acrylate oligomer having 6 functional groups and a weight-average molecular weight of 1,400 (trade name: SHIKOH UV-7600B; manufactured by Mitsubishi Chemical Corporation.)

(A2-3): urethane acrylate oligomer having 2 functional groups and a weight-average molecular weight of 13,000 (trade name: SHIKOH UV-3300B; manufactured by Mitsubishi Chemical Corporation.)

(A2-4): urethane acrylate oligomer having 3 functional groups and a weight-average molecular weight of 3,500 (trade name: SHIKOH UV-7510B; manufactured by Mitsubishi Chemical Corporation.)

<Surfactant (B2)>

(B2-1): polyoxyalkylene alkenyl ether ammonium sulfate (trade name: LATEMUL PD-104; manufactured by Kao Corporation); corresponding to General Formula (1) described above (B2-2): AMINOION RE2000L (manufactured by NIPPON NYUKAZAI CO., LTD.)

(B2-3): ADEKA REASOAP SR-10 (manufactured by ADEKA CORPORATION)

(B2-4): sodium methacryloyloxypolyoxypropylene sulfate (trade name: Eleminol RS-3000; manufactured by SANYO CHEMICAL INDUSTRIES, LTD.); corresponding to General Formula (1) described above (B2-5): polyoxyalkylene alkenyl ether (trade name: LAIEMUL PD-420; manufactured by Kao Corporation)

(B2-6): polyoxyalkylene alkenyl ether (trade name: LATEMUL PD-450; manufactured by Kao Corporation)

<Photopolymerization Initiator (C)>

(C-1): 2-hydroxy-2-methyl-1-phenylpropan-1-one (trade name: Omnirad 1173; manufactured by IGM Resins)

(C-2): 1-[4-(2-hydroxyethoxy)-phenyl]-2-hydroxy-2-methyl-1-propan-1-one (trade name: Omnirad 2959; manufactured by IGM Resins)

(C-3): 1-hydroxycyclohexylphenyl ketone (trade name: Omnirad 184; manufactured by IGM Resins)

Prior to Examples, the following urethane acrylate as the urethane (meth)acrylate (A2) and urethane acrylate as the surfactant (B1) were produced.

<Production of Urethane (Meth)Acrylate (A2)>

[Production of Urethane Acrylate (A2-5)]

Into a flask equipped with an internal thermometer, a stirrer, and a condenser, 123 g (0.554 mol) of isophorone diisocyanate, 555 g (0.277 mol) of a polyester polyol compound [bifunctional linear structure; polyvalent carboxylic acid component: adipic acid; polyhydric alcohol component: ethylene glycol and 1,4-tetramethylenediol; hydroxyl value: 56.0 mgKOH/g; number-average molecular weight calculated from the hydroxyl value: 2,004], 1.00 g of 2,6-di-tert-butyl cresol as a polymerization inhibitor, and 0.1 g of dibutyltin dilaurate as a reaction catalyst were charged, and the mixture was reacted at 60° C. When the residual isocyanate groups became 3.4% or less, 322 g (0.568 mol) of polyethylene glycol monoacrylate [hydroxyl value: 99.0 mgKOH/g, weight-average molecular weight calculated from the hydroxyl value: 567] was added thereto, and the mixture was reacted at 60° C. When the residual isocyanate groups became 0.1% or less, the reaction was terminated to obtain a composition containing a urethane acrylate (A2-5) (resin concentration: 100%, weight-average molecular weight: 13,100, viscosity: 14,500 mPa·s/60° C.).

[Production of Urethane Acrylate (A2-6)]

Into a flask equipped with an internal thermometer, a stirrer, and a condenser, 207 g (0.930 mol) of isophorone diisocyanate, 431 g (0.465 mol) of a polyester polyol compound [bifunctional linear structure; polyvalent carboxylic acid component: adipic acid and isophthalic acid; polyhydric alcohol component: 1,6-hexamethylenediol; hydroxyl value: 121 mgKOH/g; number-average molecular weight calculated from the hydroxyl value: 927], 0.4 g of 2,6-di-tert-butyl cresol as a polymerization inhibitor, and 0.1 g of dibutyltin dilaurate as a reaction catalyst were charged, and the mixture was reacted at 60° C. When the residual isocyanate groups became 6.1% or less, 319 g (0.581 mol) of polyethylene glycol monoacrylate [hydroxyl value: 102 mgKOH/g, weight-average molecular weight calculated from the hydroxyl value: 548] and 43.2 g (0.372 mol) of 2-hydroxyethyl acrylate were added thereto, and the mixture was reacted at 60° C. When the residual isocyanate groups became 0.1% or less, the reaction was terminated to obtain a composition containing a urethane acrylate (A2-6) (resin concentration: 100%, weight-average molecular weight: 6,700, viscosity: 7,500 mPa·s/60° C.).

[Production of Urethane Acrylate (A2-7)]

Into a flask equipped with an internal thermometer, a stirrer, and a condenser, 180 g (0.812 mol) of isophorone diisocyanate, 733 g (0.406 mol) of a polyester polyol compound [bifunctional linear structure; polyvalent carboxylic acid component: adipic acid and isophthalic acid; polyhydric alcohol component: 3-methyl-1,5-pentamethylenediol; hydroxyl value: 62.1 mgKOH/g; number-average molecular weight calculated from the hydroxyl value: 1810], and 0.1 g of dibutyltin dilaurate as a reaction catalyst were charged, and the mixture was reacted at 70° C. When the residual isocyanate groups became 3.7% or less, 18.0 g (0.122 mol) of dimethylolbutanoic acid was added thereto, and the mixture was reacted at 95° C. When the residual isocyanate groups became 2.6% or less, the reactant was cooled to 70° C., 68.3 g (0.588 mol) of 2-hydroxyethyl acrylate and 0.4 g of 2,6-di-tert-butyl cresol as a polymerization inhibitor were added thereto, and the mixture was reacted at 70° C. When the residual isocyanate groups became 0.1% or less, the reaction was terminated to obtain a composition containing a urethane acrylate (A2-7) (resin concentration: 100%, weight-average molecular weight: 11,000, viscosity: 260,000 mPa·s/60° C., acid value: 6.8 mgKOH/g).

[Production of Urethane Acrylate (A2-8)]

Into a flask equipped with an internal thermometer, a stirrer, and a condenser, 130 g (0.670 mol) of 1,3-bis (isocyanatomethyl)cyclohexane [corresponding to hydrogenated xylylene diisocyanate], 599 g (0.335 mol) of a polyester polyol compound [bifunctional linear structure; polyvalent carboxylic acid component: adipic acid and isophthalic acid; polyhydric alcohol component: 3-methyl-1,5-pentamethylenediol; hydroxyl value: 62.8 mgKOH/g; number-average molecular weight calculated from the hydroxyl value: 1,790], 200 g of a phenoxydiethylene glycol acrylate (A1-0) as a reactive diluent, 0.4 g of 2,6-di-tert-butyl cresol as a polymerization inhibitor, and 0.1 g of dibutyltin dilaurate as a reaction catalyst were charged, and the mixture was reacted at 70° C. When the residual isocyanate groups became 3.0% or less, 14.9 g (0.100 mol) of dimethylolbutanoic acid was added thereto, and the mixture was reacted at 80° C. When the residual isocyanate groups became 2.1% or less, the reactant was cooled to 60° C., 56.4 g (0.486 mol) of 2-hydroxyethyl acrylate was added thereto, and the mixture was reacted at 60° C. When the residual isocyanate groups became 0.1% or less, the reaction was terminated to obtain a composition containing 80 weight % of a urethane acrylate (A2-8) (weight-average molecular weight: 14,000, acid value: 7.1 mgKOH/g), and 20 weight % of the phenoxydiethylene glycol acrylate (A1-0) (viscosity: 31,000 mPa·s/60° C.).

[Production of Urethane Acrylate (A2-9)]

Into a flask equipped with an internal thermometer, a stirrer, and a condenser, 130 g (0.668 mol) of 1,3-bis (isocyanatomethyl)cyclohexane [corresponding to hydrogenated xylylene diisocyanate], 597 g (0.334 mol) of a polyester polyol compound [bifunctional linear structure; polyvalent carboxylic acid component: adipic acid and isophthalic acid; polyhydric alcohol component: 3-methyl-1,5-pentamethylenediol; hydroxyl value: 62.8 mgKOH/g; number-average molecular weight calculated from the hydroxyl value: 1,790], 200 g of a phenoxydiethylene glycol acrylate (A1-0) as a reactive diluent, 0.4 g of 2,6-di-tert-butyl cresol as a polymerization inhibitor, and 0.1 g of dibutyltin dilaurate as a reaction catalyst were charged, and the mixture was reacted at 70° C. When the residual isocyanate groups became 3.0% or less, 9.9 g (0.067 mol) of dimethylolbutanoic acid was added thereto, and the mixture was reacted at 80° C. When the residual isocyanate groups became 2.4% or less, the reactant was cooled to 60° C., 64.0 g (0.551 mol) of 2-hydroxyethyl acrylate was added thereto, and the mixture was reacted at 60° C. When the residual isocyanate groups became 0.1% or less, the reaction was terminated to obtain a composition containing 80 weight % of a urethane acrylate (A2-9) (weight-average molecular weight: 12,000, acid value: 4.7 mgKOH/g), and 20 weight % of the phenoxydiethylene glycol acrylate (A1-0) (viscosity: 16,000 mPa·s/60° C.).

<Production of Surfactant (B1)>

[Production of Urethane Acrylate (B1-1)]

Into a flask equipped with an internal thermometer, a stirrer, and a condenser, 96.1 g (0.432 mol) of isophorone diisocyanate, 606 g (0.519 mol) of an acrylic acid adduct of dipentaerythritol [hydroxyl value: 48.0 mgKOH/g], 1.65 g of 2,6-di-tert-butyl cresol as a polymerization inhibitor, and 0.1 g of dibutyltin dilaurate as a reaction catalyst were charged, and the mixture was reacted at 70° C. When the residual isocyanate groups became 2.1% or less, the reactant was cooled to 60° C., 298 g (0.302 mol) of polyethylene glycol [hydroxyl value: 114.0 mgKOH/g, weight-average molecular weight calculated from the hydroxyl value: 984] was added thereto, and the mixture was reacted at 60° C. When the residual isocyanate groups became 0.1% or less, the reaction was terminated to obtain a composition containing a urethane acrylate (B1-1) (resin concentration: 100%, weight-average molecular weight: 3,500, viscosity: 1,200 mPa·s/60° C.).

[Production of Urethane Acrylate Compound (B1-2)]

Into a flask equipped with an internal thermometer, a stirrer, and a condenser, 77.5 g (0.461 mol) of hexamethylene diisocyanate, 608 g (0.553 mol) of an acrylic acid adduct of dipentaerythritol [hydroxyl value: 51 mgKOH/g], 1.65 g of 2,6-di-tert-butyl cresol as a polymerization inhibitor, and 0.1 g of dibutyltin dilaurate as a reaction catalyst were charged, and the mixture was reacted at 70° C. When the residual isocyanate groups became 2.3% or less, the reactant was cooled to 60° C., 315 g (0.332 mol) of polyethylene glycol [hydroxyl value: 115 mgKOH/g, weight-average molecular weight calculated from the hydroxyl value: 976] was added thereto, and the mixture was reacted at 60° C. When the residual isocyanate groups became 0.1% or less, the reaction was terminated to obtain a composition containing a urethane acrylate compound (B1-2) (resin concentration: 100%, weight-average molecular weight: 3,600, viscosity: 710 mPa·s/60° C.).

[Production of Urethane Acrylate (B1-3)]

Into a flask equipped with an internal thermometer, a stirrer, and a condenser, 317 g (0.548 mol) of a trimer compound of hexamethylene diisocyanate having an isocyanurate skeleton (isocyanate group content: 21.8%), 127 g (1.07 mol) of 2-hydroxyethyl acrylate, 1.00 g of 2,6-di-tert-butyl cresol as a polymerization inhibitor, and 0.1 g of dibutyltin dilaurate as a reaction catalyst were charged, and the mixture was reacted at 60° C. When the residual isocyanate groups became 5.2% or less, 556 g (0.565 mol) of polyethylene glycol [hydroxyl value: 114.0 mgKOH/g, weight-average molecular weight calculated from the hydroxyl value: 984] was added thereto, and the mixture was reacted at 60° C. When the residual isocyanate groups became 0.1% or less, the reaction was terminated to obtain a composition containing a urethane acrylate (B1-3) (resin concentration: 100%, weight-average molecular weight: 6,100, viscosity: 1,500 mPa·s/60° C.).

[Production of Urethane Acrylate (B1-4)]

Into a flask equipped with an internal thermometer, a stirrer, and a condenser, 301 g (0.561 mol) of a biuret-type polyisocyanate compound of hexamethylene diisocyanate (isocyanate group content: 23.5%), 130 g (1.12 mol) of 2-hydroxyethyl acrylate, 1.00 g of 2,6-di-tert-butyl cresol as a polymerization inhibitor, and 0.1 g of dibutyltin dilaurate as a reaction catalyst were charged, and the mixture was reacted at 60° C. When the residual isocyanate groups became 5.5% or less, 569 g (0.578 mol) of polyethylene glycol [hydroxyl value: 114.0 mgKOH/g, weight-average molecular weight calculated from the hydroxyl value: 984] was added thereto, and the mixture was reacted at 60° C. When the residual isocyanate groups became 0.1% or less, the reaction was terminated to obtain a composition containing a urethane acrylate (B1-4) (resin concentration: 100%, weight-average molecular weight: 6,100, viscosity: 1,400 mPa·s/60° C.).

[Production of Urethane Acrylate (B1-5)]

Into a flask equipped with an internal thermometer, a stirrer, and a condenser, 324 g (0.542 mol) of a trimer compound of hexamethylene diisocyanate having an isocyanurate skeleton (isocyanate group content: 21.1%), 126 g (1.09 mol) of 2-hydroxyethyl acrylate, 1.00 g of 2,6-di-tert-butyl cresol as a polymerization inhibitor, and 0.1 g of dibutyltin dilaurate as a reaction catalyst were charged, and the mixture was reacted at 60° C. When the residual isocyanate groups became 5.1% or less, 550 g (0.559 mol) of polyethylene glycol [hydroxyl value: 114.0 mgKOH/g, weight-average molecular weight calculated from the hydroxyl value: 984] was added thereto, and the mixture was reacted at 60° C. When the residual isocyanate groups became 0.1% or less, the reaction was terminated to obtain a composition containing a urethane acrylate (B1-5) (resin concentration: 100%, weight-average molecular weight: 13,000, viscosity: 1,700 mPa·s/60° C.).

[Production of Urethane Acrylate (B1-6)]

Into a flask equipped with an internal thermometer, a stirrer, and a condenser, 529 g (0.378 mol) of an adduct-type polyisocyanate compound of hexamethylene diisocyanate (isocyanate group content: 9.0%), 87.7 g (0.756 mol) of 2-hydroxyethyl acrylate, 1.00 g of 2,6-di-tert-butyl cresol as a polymerization inhibitor, and 0.1 g of dibutyltin dilaurate as a reaction catalyst were charged, and the mixture was reacted at 60° C. When the residual isocyanate groups became 2.6% or less, 383 g (0.389 mol) of polyethylene glycol [hydroxyl value: 114.0 mgKOH/g, weight-average molecular weight calculated from the hydroxyl value: 984] was added thereto, and the mixture was reacted at 60° C. When the residual isocyanate groups became 0.1% or less, the reaction was terminated to obtain a composition containing a urethane acrylate (B1-6) (resin concentration: 100%, weight-average molecular weight: 8,600, viscosity: 2,700 mPa·s/60° C.).

<Production of Dispersion>

Example A1

Into a cylindrical container, the acrylic acid adduct of dipentaerythritol (hydroxyl value: 51 mgKOH/g, trade name: KAYARAD DPHA; manufactured by Nippon Kayaku Co., Ltd.) (A1-1) and the above-described urethane acrylate compound (B-1) were charged, the mixture was heated and maintained at 60° C., and the polyoxyalkylene alkenyl ether ammonium sulfate (trade name: LATEMUL PD-104; manufactured by Kao Corporation) (B2-1) was added thereto. Thereafter, while stirring the mixture with a disperser, purified water at 80° C. was gradually added thereto, and the mixture was stirred finally while returning to room temperature, thereby preparing an aqueous emulsion composition (non-volatile content: 50%). The blending formulation was as shown in Table 1.

Examples A2 to A43 and Comparative Examples A1 to A6

According to the blending formulation shown in Table 1, aqueous emulsion compositions (non-volatile content: 50% to 60%) were prepared in the same manner as in Example A1, and evaluated as follows. In Example A8, the aqueous emulsion composition was prepared by stirring the mixture with a homomixer instead of the disperser.

<Evaluation>

The following evaluations were carried out on the obtained aqueous emulsion compositions. The results are shown in Tables 1 to 7.

[Viscosity at 25° C.]

With regard to the aqueous emulsion compositions having a non-volatile content of 50% to 60%, which were prepared in Examples A1 to A43 and Comparative Examples A1 to A6, the viscosity at 25° C. was measured with an E-type viscometer (100 rpm).

[Average Core Particle Size]

With regard to the aqueous emulsion compositions having a non-volatile content of 50% to 60%, which were prepared in Examples A1 to A43 and Comparative Examples A1 to A6, the average core particle size (volume-based average size) was measured with a laser scattering/diffracting device (manufactured by HORIBA, Ltd.; LA950V2).

[Defoaming Property]

With regard to the aqueous emulsion compositions having a non-volatile content of 50% to 60%, which were prepared in Examples A1 to A43 and Comparative Examples A1 to A6, after standing for 3 days after preparation, the defoaming property was visually evaluated as follows.

| (Evaluation standard) |
| --- |
| 1 · · · bubbles had almost completely disappeared. |
| 2 · · · bubbles had not disappeared. |

[Storage Stability at Room Temperature]

The aqueous emulsion compositions having a non-volatile content of 50% to 60%, which were obtained in Examples A1 to A43 and Comparative Examples A1 to A6, were charged into a container with a lid, and the number of days that the composition could be stored in a state in which it was allowed to stand at room temperature of 23° C. was visually evaluated as follows.

| (Evaluation standard) |
| --- |
| 1 · · · no separation or sedimentation for 2 months or more |
| 2 · · · no separation or sedimentation for 1 week or more and less than 2 months |
| 3 · · · no separation or sedimentation for 3 days or more and less than 1 week |
| 4 · · · separation and sedimentation within 2 days |

[Storage Stability at 60° C.]

The aqueous emulsion compositions having a non-volatile content of 50% to 60%, which were obtained in Examples A2, A3, A5 to A8, A11, A12, A14, A15, A24, A34, and A42, and Comparative Examples A5 and A6, were charged into a container with a lid, and after standing at 60° C. for 1 month, the appearance of liquid was observed and the particle size was measured, and both were evaluated according to the following standard.

| |
| --- |
| 1: particle size was not increased. |
| 2: particle size was slightly increased (less than 100 nm). |
| 3: particle size was increased (100 nm or more). |
| 4: separation and sedimentation were observed or the particle size was more than 1000 nm. |

[Freeze-Thaw Stability]

The aqueous emulsion compositions having a non-volatile content of 50% to 60%, which were obtained in Examples A2, A3, A5 to A8, A11, A12, A14, A15, A24, A34, and A42, and Comparative Examples A5 and A6, were charged into a container with a lid, and after repeating a process of "freezing overnight at −30° C. and thawing at room temperature the next day" for 5 cycles, the appearance of liquid was observed and the particle size was measured, and both were evaluated according to the following standard.

| |
| --- |
| 1: particle size was not increased. |
| 2: particle size was slightly increased (less than 100 nm). |
| 3: particle size was increased (100 nm or more). |
| 4: separation and sedimentation were observed or the particle size was more than 1000 nm. |

<Production of Coating Film Sample for Evaluation>

To 100 parts of the aqueous emulsion composition having a resin content of 50%, which was obtained in Examples A2, A3, and A6, a photopolymerization initiator and a surface modifier (trade name: TegoWet 260; manufactured by Evonik Industries AG) were stirred and mixed as shown in Table 7. The mixture was applied onto an easy-adhesive polyethylene terephthalate (PET) film (manufactured by TOYOBO CO., LTD.; Cosmoshine A4300, thickness: 125 μm), or an acrylonitrile-butadiene-styrene copolymer synthetic resin (ABS) white plate (manufactured by Nippon Testpanel Co., Ltd.) or a polycarbonate (PC) plate (manufactured by Nippon Testpanel Co., Ltd.) with a bar coater, dried at 100° C. for 2 minutes, and cured by irradiating the aqueous emulsion composition with ultraviolet rays using a high-pressure mercury lamp so that an accumulated amount of light was 450 mJ/$cm^2$, thereby producing a coating film sample for evaluation, having a film thickness of 10 μm. The following evaluations were carried out on the obtained coating film sample for evaluation.

[Appearance of Coating Film]

A surface condition of the obtained cured coating film was observed and evaluated according to the following standard.

| | |
|---|---|
| 1 · · · | cissing was not observed. |
| 2 · · · | almost no cissing was observed. |
| 3 · · · | coating film defects such as cissing and lumps were observed. |

[Pencil Hardness]

Using the coating film sample for evaluation, coated on the above-described easy-adhesive PET, the pencil hardness was measured with a load of 1 kg in accordance with the method of JIS K 5600-5-4.

[ABS Adhesiveness]

Using the coating film sample for evaluation, coated on the above-described acrylonitrile-butadiene-styrene copolymer synthetic resin (ABS) white plate, as an evaluation of the adhesiveness between the cured coating film and the ABS plate, a 1 mm cross-cut substrate grid adhesion test (test method in accordance with JIS K 5600-5-6) was carried out, and the number of squares without peeling or chipping was measured.

[PC Adhesiveness]

Using the coating film sample for evaluation, coated on the above-described polycarbonate (PC) plate, as an evaluation of the adhesiveness between the cured coating film and the PC plate, a 1 mm cross-cut substrate adhesion test (test method in accordance with JIS K 5600-5-6) was carried out, and the number of squares without peeling or chipping was measured.

The coating film sample for evaluation, coated on the above-described PC plate, was immersed in boiling water for 2 hours, and the appearance of PC adhesiveness of the cured coating film immediately after being taken out were evaluated as follows. As for the PC adhesiveness, the number of squares without peeling or chipping in the cross-cut substrate grid portion was measured again in order to evaluate the PC adhesiveness before the boiling water resistance test as described above.

[Appearance after Boiling Water Resistance Test]

1: transparency was maintained without whitening.

2: whitening was observed in part.

3: whitening was observed.

TABLE 1

| | Blending component | Example A1 | Example A2 | Example A3 | Example A4 | Example A5 | Example A6 | Example A7 | Example A8 | Example A9 | Example A10 |
|---|---|---|---|---|---|---|---|---|---|---|---|
| Solid content (part) | A component | (A1-1) 80.6 | (A1-1) 74.6 | (A1-1) 75.2 | (A1-1) 80.0 | (A1-1) 76.9 | (A1-1) 74.1 | (A1-1) 71.4 | (A1-1) 69.0 | (A1-2) 80.0 | (A1-2) 76.9 |
| | B1 component | (B1-1) 16.1 | (B1-1) 22.4 | (B1-1) 22.6 | (B1-1) 16.0 | (B1-1) 19.2 | (B1-1) 22.2 | (B1-1) 25.0 | (B1-1) 27.6 | (B1-1) 16.0 | (B1-1) 19.2 |
| | B2 component | (B2-1) 3.2 | (B2-1) 3.0 | (B2-1) 2.3 | (B2-1) 4.0 | (B2-1) 3.8 | (B2-1) 3.7 | (B2-1) 3.6 | (B2-1) 3.4 | (B2-1) 4.0 | (B2-1) 3.8 |
| Stirring device | | Disperser | Disperser | Disperser | Disperser | Disperser | Disperser | Disperser | Homomixer | Disperser | Disperser |
| Non-volatile content | | 50% | 50% | 50% | 50% | 50% | 50% | 50% | 50% | 50% | 50% |
| Evaluation | Viscosity at 25° C. [mPa · s] | 23.5 | 38.2 | 25.5 | 25.9 | 34.4 | 44.1 | 54.6 | 48.6 | 25.8 | 33.5 |
| | Average core particle size [nm] | 206 | 104 | 210 | 141 | 97 | 89 | 84 | 113 | 165 | 128 |
| | Defoaming property | 1 | 1 | 1 | 1 | 1 | 1 | 1 | 1 | 1 | 1 |
| | Storage stability at room temperature | 1 | 1 | 1 | 1 | 1 | 1 | 1 | 1 | 1 | 1 |

TABLE 2

| | Blending component | Example A11 | Example A12 | Example A13 | Example A14 | Example A15 | Example A16 | Example A17 | Example A18 | Example A19 | Example A20 |
|---|---|---|---|---|---|---|---|---|---|---|---|
| Solid content (part) | A component | (A1-2) 74.1 | (A1-2) 71.4 | (A1-3) 76.9 | (A1-3) 74.1 | (A1-3) 71.4 | (A1-4) 83.3 | (A1-4) 80.0 | (A1-4) 76.9 | (A1-5) 76.9 | (A2-1) 80.0 |
| | B1 component | (B1-1) 22.2 | (B1-1) 25.0 | (B1-1) 19.2 | (B1-1) 22.2 | (B1-1) 25.0 | (B1-1) 12.5 | (B1-1) 16.0 | (B1-1) 19.2 | (B1-1) 19.2 | (B1-1) 16.0 |
| | B2 component | (B2-1) 3.7 | (B2-1) 3.6 | (B2-1) 3.8 | (B2-1) 3.7 | (B2-1) 3.6 | (B2-1) 4.2 | (B2-1) 4.0 | (B2-1) 3.8 | (B2-1) 3.8 | (B2-1) 4.0 |
| Stirring device | | Disperser | Disperser | Disperser | Disperser | Disperser | Disperser | Disperser | Disperser | Disperser | Disperser |
| Non-volatile content | | 50% | 50% | 50% | 50% | 50% | 50% | 50% | 50% | 50% | 50% |
| Evaluation | Viscosity at 25° C. [mPa · s] | 42.6 | 52.7 | 32 | 43.5 | 51.3 | 25.7 | 32.9 | 38.2 | 37.8 | 23.7 |
| | Average core particle size [nm] | 91 | 83 | 134 | 92 | 85 | 195 | 131 | 97 | 103 | 298 |

TABLE 2-continued

| | Blending component | Example A11 | Example A12 | Example A13 | Example A14 | Example A15 | Example A16 | Example A17 | Example A18 | Example A19 | Example A20 |
|---|---|---|---|---|---|---|---|---|---|---|---|
| | Defoaming property | 1 | 1 | 1 | 1 | 1 | 1 | 1 | 1 | 1 | 1 |
| | Storage stability at room temperature | 1 | 1 | 1 | 1 | 1 | 3 | 1 | 1 | 1 | 1 |

TABLE 3

| | Blending component | Example A21 | Example A22 | Example A23 | Example A24 | Example A25 | Example A26 | Example A27 | Example A28 | Example A29 | Example A30 |
|---|---|---|---|---|---|---|---|---|---|---|---|
| Solid content (part) | A component | (A2-2) 80.0 | (A2-3) 80.0 | (A2-4) 80.0 | (A1-1) 74.1 | (A1-1) 55.6 (A1-6) 18.5 | (A1-1) 55.6 (A1-7) 18.5 | (A1-1) 55.6 (A1-8) 18.5 | (A1-1) 55.6 (A1-9) 18.5 | (A1-1) 55.6 (A1-10) 18.5 | (A1-1) 55.6 (A1-11) 18.5 |
| | B1 component | (B1-1) 16.0 | (B1-1) 16.0 | (B1-1) 16.0 | (B1-1) 22.2 | (B1-1) 22.2 | (B1-1) 22.2 | (B1-1) 22.2 | (B1-1) 22.2 | (B1-1) 22.2 | (B1-1) 22.2 |
| | B2 component | (B2-1) 4.0 | (B2-1) 4.0 | (B2-1) 4.0 | (82-1) 3.7 | (B2-1} 3.7 | (B2-1) 3.7 | (B2-1) 3.7 | (92-1) 3.7 | (B2-1) 3.7 | (B2-1) 3.7 |
| Stirring device | | Disperser | Disperser | Disperser | Disperser | Disperser | Disperser | Disperser | Disperser | Disperser | Disperser |
| Non-volatile content | | 50% | 50% | 50% | 60% | 60% | 60% | 60% | 60% | 60% | 60% |
| Evaluation | Viscosity at 25° C. [mPa · s] | 221 | | 35.5 | 259.2 | 242.1 | 256.6 | 227.3 | 255 | 261.6 | 173 |
| | Average core particle size [nm] | 355 | 748 | 268 | 91 | 85 | 83 | 85 | 84 | 84 | 106 |
| | Defoaming property | 1 | 1 | 1 | 1 | 1 | 1 | 1 | 1 | 1 | 1 |
| | Storage stability at room temperature | 1 | 3 | 1 | 1 | 1 | 1 | 1 | 1 | 1 | 1 |

TABLE 4

| | Blending component | Example A31 | Example A32 | Example A33 | Example A34 | Example A35 | Example A36 | Example A37 | Example A38 | Example A39 | Example A40 |
|---|---|---|---|---|---|---|---|---|---|---|---|
| Solid content (part) | A component | (A1-1) 55.6 (A1-12) 18.5 | (A1-1) 55.6 (A1-13) 18.5 | (A1-1) 74.1 | (A1-4) 80.0 | (A1-4) 80.6 | (A-4) 81.3 | (A1-1) 80.0 | (A1-1) 80.0 | (A1-1) 80.0 | (A1-1) 74.1 |
| | B1 component | (B1-1) 22.2 | (B1-1) 22.2 | (B1-2) 22.2 | (B1-1) 16.0 | (B1-1) 16.1 | (B1-1) 16.3 | (B1-1) 16.0 | (B1-1) 16.0 | (B1-1) 16.0 | (B1-1) 22.2 |
| | B2 component | (B2-1) 3.7 | (B2-1) 3.7 | (B2-1) 3.7 | (B2-1) 4.0 | (B2-1) 3.2 | (B2-1) 2.4 | (B2-2) 4.0 | (B2-3) 4.0 | (B2-4) 4.0 | (B2-4) 3.7 |
| Stirring device | | Disperser | Disperser | Disperser | Disperser | Disperser | Disperser | Disperser | Disperser | Disperser | Disperser |
| Non-volatile content | | 60% | 60% | 60% | 60% | 60% | 60% | 50% | 50% | 50% | 50% |
| Evaluation | Viscosity at 25° C. [mPa · s] | 201.1 | 215.2 | 326.1 | 173.7 | 188.6 | 237.5 | | | 20 | 20.4 |
| | Average core particle size [nm] | 88 | 82 | 87 | 118 | 313 | 478 | 422 | 390 | 301 | 127 |
| | Defoaming property | 1 | 1 | 1 | 1 | 1 | 1 | 1 | 1 | 1 | 1 |
| | Storage stability at room temperature | 1 | 1 | 1 | 1 | 1 | 1 | 3 | 3 | 2 | 1 |

TABLE 5

| | Blending component | Example A41 | Example A42 | Example A43 | Comparative Example A1 | Comparative Example A2 | Comparative Example A3 | Comparative Example A4 | Comparative Example A5 | Comparative Example A6 |
|---|---|---|---|---|---|---|---|---|---|---|
| Solid content (part) | A component | (A1-1) 74.1 | (A1-1) 74.1 | (A1-1) 74.1 | (A1-1) 95.2 | (A1-1) 90.9 | (A1-1) 76.9 | (A1-1) 71.4 | (A1-1) 87.0 | (A1-1) 87.0 |
| | B component | (B1-1) 22.2 | (B1-1) 22.2 | (B1-1) 22.2 | 0.0 | 0.0 | (B1-1) 23.1 | (B1-1) 28.6 | 0.0 | 0.0 |
| | B2 component | (B2-1) 1.9 (B2-4) 1.9 | (B2-1) 3.0 (B2-4) 0.7 | (B2-1) 2.2 (B2-4) 1.5 | (B2-1) 4.8 | (B2-1) 9.1 | 0.0 | 0.0 | (B2-1) 4.3 (B2-5) 8.7 | (B2-1) 4.3 (B2-6) 8.7 |
| Stirring device | | Disperser | Disperser | Disperser | Disperser | Disperser | Disperser | Disperser | Disperser | Disperser |
| Non-volatile content | | 50% | 50% | 50% | 50% | 50% | 50% | 50% | 60% | 60% |
| Evaluation | Viscosity at 25° C. [mPa · s] | 26.9 | 33 | 33.1 | | | | | 102.7 | 186.7 |
| | Average core particle size [nm] | 105 | 108 | 99 | 2,302 | 2,757 | 5,333 | 2,770 | 304 | 293 |
| | Defoaming property | 1 | 1 | 1 | 1 | 1 | 1 | 1 | 2 | 2 |
| | Storage stability at room temperature | 1 | 1 | 1 | 4 | 4 | 4 | 4 | 2 | 2 |

TABLE 6

| | Blending component | Example A2 | Example A3 | Example A5 | Example A6 | Example A7 | Example A8 | Example A11 | Example A12 |
|---|---|---|---|---|---|---|---|---|---|
| Solid content (part) | A component | (A1-1) 74.6 | (A1-1) 75.2 | (A1-1) 76.9 | (A1-1) 74.1 | (A1-1) 71.4 | (A1-1) 69.0 | (A1-2) 74.1 | (A1-2) 71.4 |
| | B1 component | (B1-1) 22.4 | (B1-1) 22.6 | (B1-1) 19.2 | (B1-1) 22.2 | (B1-1) 25.0 | (B1-1) 27.6 | (B1-1) 22.2 | (B1-1) 25.0 |
| | B2 component | (B2-1) 3.0 | (B2-1) 2.3 | (B2-1) 3.8 | (B2-1) 3.7 | (B2-1) 3.6 | (B2-1) 3.4 | (B2-1) 3.7 | (B2-1) 3.6 |
| Stirring device | | Disperser | Disperser | Disperser | Disperser | Disperser | Homomixer | Disperser | Disperser |
| Non-volatile content | | 50% | 50% | 50% | 50% | 50% | 50% | 50% | 50% |
| Evaluation | Storage stability at 60° C. | 2 | 3 | 1 | 1 | 1 | 2 | 1 | 1 |
| | Freeze-thaw stability | 1 | 1 | 3 | 2 | 1 | 1 | 2 | 2 |

| | Blending component | Example A14 | Example A15 | Example A24 | Example A34 | Example A42 | Comparative Example A5 | Comparative Example A6 |
|---|---|---|---|---|---|---|---|---|
| Solid content (part) | A component | (A1-3) 74.1 | (A1-3) 71.4 | (A1-1) 74.1 | (A1-4) 80.0 | (A1-1) 74.1 | (A1-1) 87.0 | (A1-1) 87.0 |
| | B1 component | (B1-1) 22.2 | (B1-1) 25.0 | (B1-1) 22.2 | (B1-1) 16.0 | (B1-1) 22.2 | 0.0 | 0.0 |
| | B2 component | (B2-1) 3.7 | (B2-1) 3.6 | (B2-1) 3.7 | (B2-1) 4.0 | (B2-1) 3.0 (B2-4) 0.7 | (B2-1) 4.3 (B2-5) 8.7 | (B2-1) 4.3 (B2-6) 8.7 |
| Stirring device | | Disperser | Disperser | Disperser | Disperser | Disperser | Disperser | Disperser |
| Non-volatile content | | 50% | 50% | 60% | 60% | 50% | 60% | 60% |
| Evaluation | Storage stability at 60° C. | 2 | 2 | 3 | 3 | 3 | 4 | 3 |
| | Freeze-thaw stability | 2 | 2 | 1 | 1 | 1 | 4 | 4 |

TABLE 7

| | | | Example A44 | Example A45 | Example A46 | Example A47 | Example A48 | Example A49 | Example A50 | Example A51 | Example A52 |
|---|---|---|---|---|---|---|---|---|---|---|---|
| Blending amount (part) | Aqueous emulsion composition | Example A6 | 100 | | | 100 | 100 | 100 | 100 | 100 | 100 |
| | | Example A2 | | 100 | | | | | | | |
| | | Example A3 | | | 100 | | | | | | |
| | Photopolymerization initiator | (C-1) | 4 | 4 | 4 | 3 | 2 | 1 | | | 4 |
| | | (C-2) | | | | | | | 1 | | 1 |
| | | (C-3) | | | | 1 | 2 | 3 | | 2 | |
| | Surface modifier | TegoWet 260 | 1 | 1 | 1 | 1 | 1 | 1 | 1 | 1 | 1 |
| Evaluation | Appearance of coating film after UV curing | | 1 | 2 | 2 | 2 | 2 | 2 | 1 | 1 | 1 |
| | Pencil hardness (1 kg load) | | H | 2 H | H | 3 H | 3 H | 3 H | 3 H | 3 H | 3 H |
| | ABS adhesiveness | | 100 | 100 | 100 | 100 | 100 | 100 | 100 | 100 | 100 |
| | PC adhesiveness | | 100 | 100 | 100 | 100 | 100 | 95 | 98 | 98 | 100 |
| | Appearance after boiling water resistance test | | 1 | 1 | 1 | 1 | 1 | 1 | 1 | 1 | 1 |
| | PC adhesiveness after boiling water resistance test | | 100 | 100 | 100 | 93 | 95 | 95 | 47 | 95 | 98 |

<Production of Dispersion>

Example B1

Into a cylindrical container, the urethane acrylate (A2-5), the photopolymerizable compound (A1-0), and the urethane acrylate (B1-1) were charged, the mixture was heated and maintained at 60° C., and the surfactant (B2-1) was added thereto. Thereafter, while stirring the mixture with a disperser, purified water at 50° C. was gradually added thereto, and the mixture was stirred finally while returning to room temperature, thereby preparing an aqueous emulsion composition (non-volatile content: 50%). The blending formulation was as shown in Table 8.

Examples B2 to B4 and Comparative Examples B1 and B2

Aqueous emulsion compositions (non-volatile content: 50%) were prepared in the same manner as in Example B1, except that the blending formulation was changed as shown in Table 8.

Example B9

Into a cylindrical container, the urethane acrylate (A2-7), the photopolymerizable compound (A1-0), and the urethane acrylate (B1-1) were charged, the mixture was heated and maintained at 60° C., and the monofunctional reactive surfactant (B2-1) and triethylamine as a base component for neutralizing acid groups of the urethane acrylate (A2-7) were added thereto. Thereafter, while stirring the mixture with a disperser, purified water at 55° C. was gradually added thereto, and the mixture was stirred finally while returning to room temperature, thereby preparing an active energy ray-curable aqueous emulsion composition (non-volatile content: 50%). The blending formulation was as shown in Table 8.

Examples B10 to B18

Aqueous emulsion compositions (non-volatile content: 50%) were prepared in the same manner as in Example B9, except that the blending formulation was changed as shown in Table 8.

<Evaluation>

The following evaluations were carried out on the aqueous emulsion compositions in each example.

[Viscosity at 25° C.]

With regard to the aqueous emulsion compositions having a non-volatile content of 50%, which were prepared in Examples B1 to B4 and B9 to B18, the viscosity at 25° C. was measured with an E-type viscometer (100 rpm).

[Average Core Particle Size]

With regard to the aqueous emulsion compositions having a non-volatile content of 50%, which were prepared in Examples B1 to B4 and B9 to B18 and Comparative Examples B1 and B2, the average core particle size (volume-based average size) was measured with a laser scattering/diffracting device (manufactured by HORIBA, Ltd.; LA950V2).

[Storage Stability at Room Temperature]

The aqueous emulsion compositions having a non-volatile content of 50%, which were prepared in Examples B1 to B4 and B9 to B18 and Comparative Examples B1 and B2, were charged into a container with a lid, and the number of days that the composition could be stored in a state in which it was allowed to stand at room temperature (25° C.) was visually evaluated as follows.

| (Evaluation standard) |
|---|
| 1: no separation or sedimentation for 2 months or more<br>2: no separation or sedimentation for 1 week or more and less than 2 months<br>3: no separation or sedimentation for 3 days or more and less than 1 week<br>4: separation and sedimentation within 2 days |

[Storage Stability at 40° C.]

The aqueous emulsion compositions having a non-volatile content of 50%, which were prepared in Examples B1 to B4, were charged into a container with a lid, and after standing at 40° C. for 2 weeks, the appearance of liquid was observed and the particle size was measured, and both were evaluated according to the following standard.

| (Evaluation standard) |
|---|
| 1: particle size was not increased.<br>2: particle size was slightly increased (less than 100 nm).<br>3: particle size was increased (100 nm or more).<br>4: separation and sedimentation were observed or the particle size was more than 1000 nm. |

Examples B5 to B8 and B19 to B28

Using the aqueous emulsion compositions having a non-volatile content of 50%, which were obtained in Examples B1 to B4, coating film samples were produced by the method described below, and evaluated.

[Production of Coating Film Sample for Evaluation]

To 100 parts by weight of the aqueous emulsion composition having a non-volatile content of 50%, which was obtained in Examples B1 to B4 and B9 to B18, a photopolymerization initiator (C-2) and a surface modifier (trade name: TegoWet 270; manufactured by Evonik Industries AG) were stirred and mixed as shown in Table 9. The mixture was applied onto an easy-adhesive polyethylene terephthalate (PET) film (manufactured by TOYOBO CO., LTD.; Cosmoshine A4360, thickness: 125 μm), or an acrylonitrile-butadiene-styrene copolymer synthetic resin (ABS) white plate (manufactured by Nippon Testpanel Co., Ltd.) or a polycarbonate (PC) plate (manufactured by Nippon Testpanel Co., Ltd.) with a bar coater, dried at 100° C. for 2 minutes, and cured by irradiating the aqueous emulsion composition with ultraviolet rays using a high-pressure mercury lamp so that an accumulated amount of light was 1,000 mJ/cm$^2$, thereby producing a coating film sample for evaluation, having a film thickness of 10 μm. The following evaluations were carried out on the obtained coating film sample for evaluation.

[Appearance of Coating Film]

A surface condition of the coating film sample for evaluation was observed and evaluated according to the following standard.

| (Evaluation standard) |
|---|
| 1: cissing was not observed.<br>2: almost no cissing was observed.<br>3: coating film defects such as cissing and lumps were observed. |

[Pencil Hardness]

Using the coating film sample for evaluation, coated on the above-described easy-adhesive PET film, the pencil hardness was measured with a load of 750 g in accordance with the method of JIS K 5600-5-4.

[Flexibility]

The coating film sample for evaluation was evaluated for flexibility using a cylindrical mandrel bending tester in accordance with JIS K 5600-5-1. When the coating film sample for evaluation was wound around a test bar, the maximum diameter (integer value, mm) at which cracking or peeling occurred was measured and evaluated as follows.

| (Evaluation standard) |
|---|
| 1: less than 2 (no cracks even with a diameter of 2 mm)<br>2: 2 to 3<br>3: 4 to 5<br>4: 6 or more |

[ABS Adhesiveness]

Using the coating film sample for evaluation, coated on the ABS white plate, as an evaluation of the adhesiveness between the cured coating film and the ABS plate, a 1 mm cross-cut substrate adhesion test was carried out, and the number of squares without peeling or chipping was measured.

[PC Adhesiveness]

Using the coating film sample for evaluation, coated on the PC plate, as an evaluation of the adhesiveness between the cured coating film and the PC plate, a 1 mm cross-cut substrate adhesion test was carried out, and the number of squares without peeling or chipping was measured.

[Production of Coating Film Sample for Elongation Evaluation]

Each component was mixed according to the solid content blending ratio of Examples B1 to B4 and B9 to B18 in Table 8, so that the solid content of the mixture was 100 parts, 4 parts of the photopolymerization initiator (C-3) was added thereto, and the mixture was diluted with ethyl acetate to a solid content of 70% to 80%, thereby preparing an active energy ray-curable composition. The prepared active energy ray-curable composition was applied onto a release polyethylene terephthalate (PET) film (thickness: 100 μm) with an applicator, dried at 60° C. for 30 minutes, and cured by irradiating the active energy ray-curable composition with ultraviolet rays using a high-pressure mercury lamp so that an accumulated amount of light was 1,000 mJ/cm$^2$, thereby producing a coating film sample for evaluation, having a film thickness of 100 μm. Next, the coating film sample for evaluation was punched out with a dumbbell to produce a strip-shaped sample having a width of 15 mm and a length of 75 mm, and the cured coating film was peeled off from the PET film to obtain a coating film sample for elongation evaluation.

[Elongation]

The coating film sample for elongation evaluation was subjected to a tensile test in accordance with JIS K 7127 using a tensile tester "AG-X" (manufactured by Shimadzu Corporation) at a temperature of 23° C. and a humidity of 50%. The elongation was measured at a breaking point of the coating film with a tensile speed of 10 mm/min.

Tables 8 and 9 show the evaluation results of each example.

TABLE 8

| | Blending component | Example B1 | Example B2 | Example B3 | Example B4 | Comparative Example B1 | Comparative Example B2 | Example B9 | Example B10 |
|---|---|---|---|---|---|---|---|---|---|
| Solid content [part] | A component | (A2-5)<br>59.3<br>(A1-0)<br>14.8 | (A2-6)<br>59.3<br>(A1-0)<br>14.8 | (A2-6)<br>60.6<br>(A1-0)<br>15.2 | (A1-1)<br>74.1 | (A2-6)<br>72.7<br>(A1-0)<br>18.2 | (A2-6)<br>59.3<br>(A1-0)<br>14.8 | (A2-7)<br>59.3<br>(A1-0)<br>14.8 | (A2-8)<br>59.3<br>(A1-0)<br>14.8 |

TABLE 8-continued

| | | | | | | | | | | |
|---|---|---|---|---|---|---|---|---|---|---|
| | B1 component | | (B1-1) 22.2 | (B1-1) 22.2 | (B1-1) 18.9 | (B1-1) 22.2 | | (B1-1) 25.9 | (B1-1) 22.2 | (B1-1) 22.2 |
| | B2 component | | (B2-1) 3.7 | (B2-1)\| 3.7 | (B2-1) 5.3 | (B2-1) 3.7 | (B2-1) 9.1 | | (B2-1) 3.7 | (B2-1) 3.7 |
| Volatile content [part] | Base | Triethylamine | | | | | | | 0.81 | 0.83 |
| Stirring device | | | Disperser | Disperser | Disperser | Disperser | Disperser | Disperser | Disperser | Disperser |
| Non-volatile content | | | 50% | 50% | 50% | 50% | 50% | 50% | 50% | 50% |
| Evaluation | Viscosity at 25° C. [mPa · s] | | 937 | 451 | 356 | 50 | | | 71 | 103 |
| | Average core particle size [nm] | | 100 | 102 | 95 | 148 | 858 | 649 | 135 | 148 |
| | Storage stability at 25° C. | | 1 | 1 | 1 | 1 | 4 | 4 | 1 | 1 |
| | Particle size after 2 weeks at 40° C. [nm] | | 96 | 129 | 112 | 152 | | | | |
| | Storage stability after 2 weeks at 40° C. | | 1 | 2 | 2 | 2 | | | | |
| | Blending component | | Example | Example | Example | Example | Example | Example | Example | Example |
| Solid content [part] | A component | | B11 (A2-9) 59.3 (A1-0) 14.8 | B12 (A2-7) 59.3 (A1-14) 14.8 | B13 (A2-7) 59.3 (A1-15) 14.8 | B14 (A2-7) 59.3 (A1-15) 14.8 | B15 (A2-7) 59.3 (A1-0) 14.8 | B16 (A2-7) 59.3 (A1-0) 14.8 | B17 (A2-7) 59.3 (A1-0) 14.8 | B18 (A2-7) 59.3 (A1-0) 14.8 |
| | B1 component | | (B1-1) 22.2 | (B1-1) 22.2 | (B1-1) 22.2 | (B1-3) 22.2 | (B1-3) 22.2 | (B1-4) 22.2 | (B1-5) 22.2 | (B1-6) 22.2 |
| | B2 component | | (B2-1) 3.7 | (B2-1) 3.7 | (B2-1) 3.7 | (B2-1) 3.7 | (B2-1) 3.7 | (B2-1) 3.7 | (B2-1) 3.7 | (B2-1) 3.7 |
| Volatile content [part] | Base | Triethylamine | 0.44 | 0.81 | 0.81 | 0.81 | 0.81 | 0.81 | 0.81 | 0.81 |
| Stirring device | | | Disperser | Disperser | Disperser | Disperser | Disperser | Disperser | Disperser | Disperser |
| Non-volatile content | | | 50% | 50% | 50% | 50% | 50% | 50% | 50% | 50% |
| Evaluation | Viscosity at 25° C. [mPa · s] | | 79 | 42 | 302 | 97 | 107 | 57 | 117 | 146 |
| | Average core particle size [nm] | | 207 | 239 | 126 | 235 | 142 | 351 | 165 | 215 |
| | Storage stability at 25° C. | | 1 | 1 | 1 | 1 | 1 | 1 | 1 | 1 |
| | Particle size after 2 weeks at 40° C. [nm] | | | | | | | | | |
| | Storage stability after 2 weeks at 40° C. | | | | | | | | | |

| | | | Example B5 | Example B6 | Example B7 | Example B8 | Example B19 | Example B20 | Example B21 |
|---|---|---|---|---|---|---|---|---|---|
| Blending amount [part] (solid content) | Emulsion composition | Example B1 | 100 | | | | | | |
| | | Example B2 | | 100 | | | | | |
| | | Example B3 | | | 100 | | | | |
| | | Example B4 | | | | 100 | | | |
| | | Example B9 | | | | | 100 | | |

-continued

| | | | | | | | | | |
|---|---|---|---|---|---|---|---|---|---|
| | | Example B10 | | | | | | 100 | |
| | | Example B11 | | | | | | | 100 |
| | | Example B12 | | | | | | | |
| | | Example B13 | | | | | | | |
| | | Example B14 | | | | | | | |
| | | Example B15 | | | | | | | |
| | | Example B16 | | | | | | | |
| | | Example B17 | | | | | | | |
| | | Example B18 | | | | | | | |
| | Photopolymerization initiator | (C-2) | 2 | 2 | 2 | 2 | 2 | 2 | 2 |
| | Surface modifier | TegoWet 270 | 1 | 1 | 1 | 1 | 1 | 1 | 1 |
| Evaluation | Appearance of coating film after UV curing | | 2 | 2 | 2 | 2 | 2 | 2 | 2 |
| | Pencil hardness (750 g load) | | Less than 6 B | 6 E | 5 B | 3 H | Less than 6 B | Less than 6 B | Less than 6 B |
| | Flexibility (mandrel test) | | <2 mmΦ 1 | <2 mmΦ 1 | <2 mmΦ 1 | >25 mmΦ 4 | <2 mmΦ 1 | <2 mmΦ 1 | <2 mmΦ 1 |
| | ABS adhesiveness | Remaining number | 100 | 100 | 100 | 100 | 100 | 100 | 100 |
| | PC adhesiveness | Remaining number | 100 | 100 | 100 | 100 | 100 | 100 | 100 |
| | Tensile elongation [%] | | 26 | 23 | 22 | 0 | 38 | 49 | 46 |

| | | | Example B22 | Example B23 | Example B24 | Example B25 | Example B26 | Example B27 | Example B28 |
|---|---|---|---|---|---|---|---|---|---|
| Blending amount [part] (solid content) | Emulsion composition | Example B1 | | | | | | | |
| | | Example B2 | | | | | | | |
| | | Example B3 | | | | | | | |
| | | Example B4 | | | | | | | |
| | | Example B9 | | | | | | | |
| | | Example B10 | | | | | | | |
| | | Example B11 | | | | | | | |
| | | Example B12 | 100 | | | | | | |
| | | Example B13 | | 100 | | | | | |
| | | Example B14 | | | 100 | | | | |
| | | Example B15 | | | | 100 | | | |
| | | Example B16 | | | | | 100 | | |
| | | Example B17 | | | | | | 100 | |
| | | Example B18 | | | | | | | 100 |
| | Photopolymerization initiator | (C-2) | 2 | 2 | 2 | 2 | 2 | 2 | 2 |
| | Surface modifier | TegoWet 270 | 1 | 1 | 1 | 1 | 1 | 1 | 1 |
| Evaluation | Appearance of coating film after UV curing | | 2 | 2 | 2 | 2 | 2 | 2 | 2 |
| | Pencil hardness (750 g load) | | Less than 6 B | Less than 6 B | Less than 6 B | Less than 6 B | Less than 6 B | Less than 6 B | Less than 6 B |
| | Flexibility (mandrel test) | | <2 mmΦ 1 | <2 mmΦ 1 | <2 mmΦ 1 | <2 mmΦ 1 | <2 mmΦ 1 | <2 mmΦ 1 | <2 mmΦ 1 |

-continued

| | | | | | | | | |
|---|---|---|---|---|---|---|---|---|
| ABS adhesiveness | Remaining number | 100 | 100 | 100 | 100 | 100 | 100 | 100 |
| PC adhesiveness | Remaining number | 100 | 100 | 100 | 100 | 100 | 100 | 100 |
| Tensile elongation [%] | | 45 | 55 | 137 | 123 | 85 | 101 | 98 |

As shown in Tables 8 and 9, in the aqueous emulsion compositions of Examples B1 to B4 and B9 to B18, which were forcibly emulsified with two or more kinds of surfactants including the surfactant (B1), compared with the emulsion compositions of Comparative Examples B1 and B2, the composition was uniform and had small particle size, and the storage stability was excellent at room temperature and at 40° C. In addition, the coating films of Examples B5 to B8 and B19 to B28, in which the aqueous emulsion compositions of Examples B1 to B4 and B9 to B18 were used, had excellent adhesiveness to the substrate.

In addition, the coating films of Examples B5 to B7, and B19 to B28, in which the aqueous emulsion compositions of Examples B1 to B3 and B9 to B18 containing the urethane (meth)acrylate (A2) were used, were superior in flexibility as compared with the coating film of Example B8, in which the aqueous emulsion composition of Example B4 not containing the urethane (meth)acrylate (A2) was used.

INDUSTRIAL APPLICABILITY

Since the aqueous emulsion composition using the active energy ray-curable composition according to the embodiment of the present invention has excellent storage stability at room temperature and high temperature and excellent freeze-thaw stability, a coating film to be coated on a substrate has excellent adhesiveness and water resistance, and the aqueous emulsion composition is very useful as various film-forming materials such as paints, pressure-sensitive adhesives, adhesives, tackifiers, inks, protective coating agents, anchor coating agents, coating agents for hard coating, magnetic powder coating binders, sandblasting films, plate materials, coating agents for optical film topcoat, metal vapor deposition and sputtering films, coating agents for glass modification, and the like.

What is claimed is:

1. An active energy ray-curable composition, comprising:

a first surfactant (B1) comprising a first reactive group and a second reactive group; and a second surfactant (B2) of formula (1), having a single reactive group:

$$XO—(Y1O)_m—(Y2O)_n—SO_3Z, \quad (1)$$

wherein

X is a functional group comprising a double bond,

Y1 and Y2 are alkylene groups, Y1 and Y2 being different from each other,

Z is a counterion, m is an integer of 1 or more, and n is an integer of 0 or more.

2. The active energy ray-curable composition of claim 1, comprising the first surfactant (B1) in 50 weight % or more, with respect to a total surfactant mass.

3. The active energy ray-curable composition of claim 1, wherein the first surfactant (B1) comprises a polyoxyalkylene chain in a structure of the first surfactant (B1).

4. The active energy ray-curable composition of claim 1, wherein the first surfactant (B1) is a urethane (meth)acrylate.

5. The active energy ray-curable composition of claim 1, further comprising:

a photopolymerizable compound (A).

6. The active energy ray-curable composition of claim 5, wherein the photopolymerizable compound (A) comprises a (meth)acrylate monomer (A1).

7. The active energy ray-curable composition of claim 5, wherein the photopolymerizable compound (A) comprises a urethane (meth)acrylate (A2) different from the first surfactant (B1).

8. The active energy ray-curable composition of claim 5 comprising the photopolymerizable compound (A) in a range of from 40 to 99 weight %, with respect to 100 weight % of a total of the photopolymerizable compound (A) and the surfactants.

9. The active energy ray-curable composition of claim 1, further comprising:

a photopolymerization initiator (C).

10. The active energy ray-curable composition of claim 1, further comprising:

water.

11. An aqueous emulsion, comprising:

the active energy ray-curable composition of claim 1.

12. A coating agent composition, comprising:

the active energy ray-curable composition of claim 1.

13. A laminate, comprising:

a layer formed of the active energy ray-curable composition of claim 1.

14. An aqueous emulsion, comprising:

the active energy ray-curable composition of claim 1, wherein a pencil hardness of a coating film formed, measured with a load of 1 kg in accordance according to JIS K 5600-5-4, is 2 H or more, wherein the pencil hardness is measured by applying the aqueous emulsion onto a surface of an easy-adhesive polyethylene terephthalate film having a thickness of 125 μm with a bar coater, drying at 100° C. for 2 minutes, and curing by irradiating the aqueous emulsion with ultraviolet rays using a high-pressure mercury lamp so that an accumulated amount of light is 450 mJ/cm2, to form a coating film having a film thickness of 10 μm.

15. The active energy ray-curable composition of claim 1, further comprising:

a photopolymerizable compound (A) comprising a (meth) acrylate monomer (A1) or a urethane (meth)acrylate (A2) different from the first surfactant (B1);

a photopolymerization initiator (C); and water, wherein the photopolymerizable compound (A) is present in a range of from 40 to 99 weight %, with respect to 100 weight % of a total of the photopolymerizable compound (A) and the surfactants.

16. The active energy ray-curable composition of claim 6, comprising the photopolymerizable compound (A) in a range of from 40 to 99 weight %, with respect to 100 weight % of a total of the photopolymerizable compound (A) and the surfactants.

17. The active energy ray-curable composition of claim 7, comprising the photopolymerizable compound (A) in a range of from 40 to 99 weight %, with respect to 100 weight % of a total of the photopolymerizable compound (A) and the surfactants.

18. The active energy ray-curable composition of claim 1, comprising, relative to a total weight of the active energy ray-curable composition, the first surfactant (B1) in a range of from 0.9 to 59.9 weight %, and the second surfactant (B2) in a range of from 0.1 to 20 weight %.

19. The active energy ray-curable composition of claim 1, comprising, relative to a total weight of the active energy ray-curable composition, the first surfactant (B1) in a range of from 4.0 to 49 weight %, and the second surfactant (B2) in a range of from 1.0 to 10 weight %.

20. The composition of claim 15, comprising, relative to a total weight of the active energy ray-curable composition, the first surfactant (B1) in a range of from 8.5 to 38.5 weight %, and the second surfactant (B2) in a range of from 1.5 to 7.0 weight %.

* * * * *